United States Patent
Smadi et al.

(10) Patent No.: US 10,192,516 B2
(45) Date of Patent: *Jan. 29, 2019

(54) METHOD FOR WIRELESSLY TRANSMITTING CONTENT FROM A SOURCE DEVICE TO A SINK DEVICE

(71) Applicant: BlackBerry Limited, Waterloo (CA)

(72) Inventors: Mohammed Nawaf Smadi, Ancaster (CA); Wolfgang Michael Theimer, Bochum (DE); Vytautas Robertas Kezys, Ancaster (CA)

(73) Assignee: BlackBerry Limited, Waterloo (CA)

(*) Notice: Subject to any disclaimer, the term of this patent is extended or adjusted under 35 U.S.C. 154(b) by 73 days.

This patent is subject to a terminal disclaimer.

(21) Appl. No.: 15/230,573

(22) Filed: Aug. 8, 2016

(65) Prior Publication Data

US 2017/0032762 A1 Feb. 2, 2017

Related U.S. Application Data

(63) Continuation of application No. 14/136,944, filed on Dec. 20, 2013, now Pat. No. 9,412,332.

(51) Int. Cl.
*G06F 3/14* (2006.01)
*G06T 1/20* (2006.01)
(Continued)

(52) U.S. Cl.
CPC .......... *G09G 5/006* (2013.01); *G06F 3/1454* (2013.01); *G06T 1/20* (2013.01); *G09G 5/005* (2013.01);
(Continued)

(58) Field of Classification Search
None
See application file for complete search history.

(56) References Cited

U.S. PATENT DOCUMENTS

| 6,545,683 B1 | 4/2003 | Williams |
| 7,062,088 B1 | 6/2006 | Clauson |

(Continued)

FOREIGN PATENT DOCUMENTS

| WO | WO 2013100968 | 12/2011 |
| WO | WO 2012106644 | 8/2012 |
| WO | WO 2012159640 | 11/2012 |

OTHER PUBLICATIONS

Extended European Search Report; EP 14198265.2; dated May 29, 2015.

(Continued)

*Primary Examiner* — Aaron M Richer
*Assistant Examiner* — Khoa Vu
(74) *Attorney, Agent, or Firm* — Ridout and Maybee LLP

(57) ABSTRACT

Methods and devices for wirelessly transmitting content from a source device to a sink device are disclosed. The method comprises: identifying one or more data types associated with a display frame displayed on the source device; selecting a transmission format for the display frame in accordance with the one or more identified data types, wherein the transmission format is selected from the group consisting of screencasting, graphics processing unit (GPU) processing, or GPU processing with media streaming; and sending visual information representing the display frame in the transmission selected transmission format to the sink device. One or a combination of latency, image/video quality, and power consumption associated with the wireless transmission may be used to adapt the wireless transmission.

21 Claims, 7 Drawing Sheets

(51) Int. Cl.
    *G09G 5/00*     (2006.01)
    *G09G 5/18*     (2006.01)
    *H04W 4/18*     (2009.01)
    *H04L 29/06*     (2006.01)
    *H04N 19/44*     (2014.01)
    *H04N 19/70*     (2014.01)

(52) U.S. Cl.
    CPC .............. *G09G 5/18* (2013.01); *H04L 65/607* (2013.01); *H04L 67/38* (2013.01); *H04N 19/44* (2014.11); *H04N 19/70* (2014.11); *G06T 2200/28* (2013.01); *G09G 2320/0613* (2013.01); *G09G 2330/021* (2013.01); *G09G 2340/02* (2013.01); *G09G 2350/00* (2013.01); *G09G 2370/04* (2013.01); *G09G 2370/16* (2013.01); *H04L 65/60* (2013.01); *H04L 65/80* (2013.01); *H04W 4/18* (2013.01)

(56) References Cited

U.S. PATENT DOCUMENTS

| | | |
|---|---|---|
| 8,254,441 B2 | 8/2012 | Sun |
| 2006/0164328 A1 | 7/2006 | Jaff |
| 2006/0242091 A1 | 10/2006 | Jansky |
| 2007/0153004 A1 | 7/2007 | Airey et al. |
| 2009/0089453 A1 | 4/2009 | Bohan et al. |
| 2010/0104021 A1 | 4/2010 | Schmit |
| 2011/0078532 A1 | 3/2011 | Vonog et al. |
| 2011/0157196 A1 | 6/2011 | Nave |
| 2012/0019522 A1 | 1/2012 | Lawrence et al. |
| 2012/0076197 A1 | 3/2012 | Byford et al. |
| 2012/0192243 A1* | 7/2012 | Hall ................. H04N 21/43637 725/118 |
| 2012/0257117 A1 | 10/2012 | Freundlich et al. |
| 2013/0033496 A1 | 2/2013 | Raveendran et al. |
| 2013/0047189 A1* | 2/2013 | Raveendran ........... H04N 21/23 725/81 |
| 2013/0346562 A1* | 12/2013 | Kim ...................... H04L 65/608 709/219 |
| 2014/0085314 A1 | 3/2014 | Steinke |
| 2014/0334381 A1* | 11/2014 | Subramaniam ....... H04L 65/604 370/328 |

OTHER PUBLICATIONS

Nave, I, et al. "Games@large graphics streaming architecture", Consumer electronics, 2008, ISCE 2008, IEEE International Symposium On, IEE, Piscataway, NJ—Apr. 14, 2008.

Dream Chip xBounds, Product Info Page: http://www.dreamchip.de/products/xbounds.html; 2 pages; at least as early as Aug. 27, 2013.

PLAir Media, engadget blog post: http://www.engadget.com/2013/03/16/plair-wireless-video-streaming-hdml-dongle/4 pages; Mar. 16, 2013.

OpenGL documentation, "glReadPixels" command, http://www.opengl.org/sdk/docs/man/xhtml/glReadPixels.xml; 4 pages; at least as early as Oct. 19, 2013.

Communication Pursuant to Article 94(3) EPC; EP 14198265.2; dated Jul. 6, 2018.

* cited by examiner

METHOD FOR WIRELESSLY TRANSMITTING CONTENT FROM A SOURCE DEVICE TO A SINK DEVICE

RELATED APPLICATION DATA

The present application is a continuation of U.S. patent application Ser. No. 14/136,944, filed Dec. 20, 2013, the content of which is incorporated herein by reference.

TECHNICAL FIELD

The present disclosure relates generally to techniques in wireless communication devices which are configured for wireless transmission of display frames, for example, by using a wireless transmission channel configured for Wi-Fi peer-to-peer (P2P) communication.

BACKGROUND

A wireless communication device, such as a portable battery-powered wireless communication device, may be configured to communicate via access points (APs) of wireless local area networks (WLANs) in accordance with IEEE 802.11 standards or the like. Such a device may additionally communicate using peer-to-peer communication techniques, for example, over a wireless transmission channel configured in accordance with the "Wi-Fi Direct" technical specification (also known as Wi-Fi Peer-To-Peer ("Wi-Fi P2P") technical specification). Such a device may be certified as a Wi-Fi Direct device.

There is a need for efficiently facilitating transmission of a stream of display frames over the wireless transmission channel to enable wireless communication devices to transmit and/or receive display frames to a second communication device such as a television, for display at the second communication device. This is useful, for example, when one portable wireless communication device has a smaller sized display screen than the second communication device.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1B:
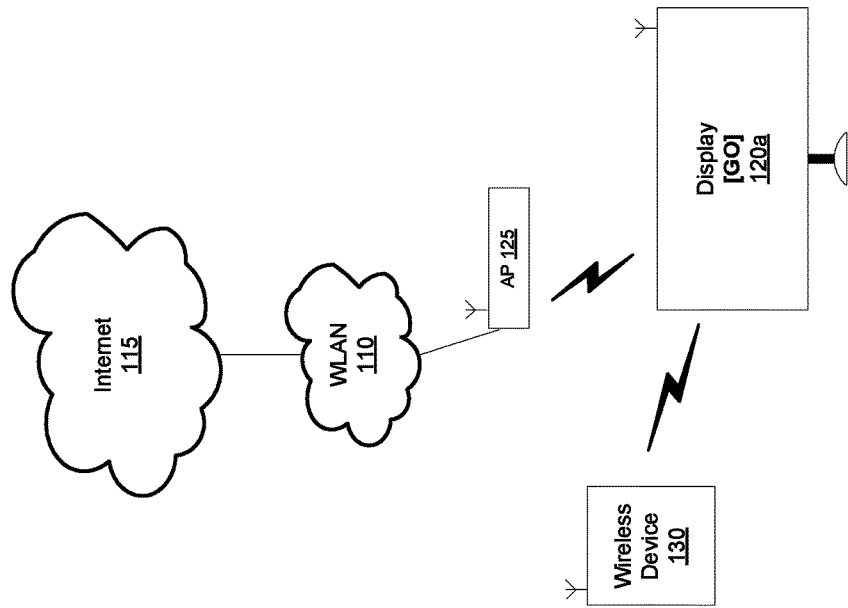
FIG. 1B illustrates an additional example environment within which the techniques of the present disclosure can be practiced.

Transmission of a stream of display frames from a first device to a second device, over a wireless transmission channel, for display at the second device enables many applications. For example, an Internet-connected portable wireless communication device may stream a video from a video sharing Internet site and wirelessly transmit the video to a television having a larger display screen. In another example, a presentation, video or other media stored in the memory of a portable wireless communication device may be wirelessly transmitted to a projector for presentation to an audience. However, as such applications require real-time or near real-time processing and transmission of the display frames, more efficient encoding of the media is necessary to allow for reduced latency of transmission, and to occupy the wireless channel more efficiently, thus reducing the bandwidth for transmission.

The present disclosure provides methods and devices for wirelessly transmitting content from a source device to a sink device are disclosed. The method comprises: determining one or more data types associated with display content of the source device; selecting a format for transmitting the display frame in accordance with the one or more determined data types, wherein the format is selected from the group consisting of screencasting, graphics processing unit (GPU) encoding, or a GPU encoding with media streaming; preparing the content in the selecting format; and sending the prepared content to the sink device. One or a combination of latency, image/video quality, and power consumption associated with the wireless transmission may be used to adapt the wireless transmission.

In accordance with one embodiment of a first aspect of the present disclosure, there is provided a method for wirelessly transmitting content from a source device to a sink device, comprising: identifying one or more data types associated with a display frame displayed on the source device; selecting a transmission format for the display frame in accordance with the one or more identified data types, wherein the transmission format is selected from the group consisting of screencasting, graphics processing unit (GPU) processing, or GPU processing with media streaming; and sending visual information representing the display frame in the transmission selected transmission format to the sink device.

In accordance with one embodiment of a another aspect of the present disclosure, there is provided a method for wirelessly receiving content on a sink device from a source device, comprising: receiving a set of one or more GPU display commands and encoded media from the source device; performing the set of one or more GPU display commands on one or more graphics resources to generate programmatically generated graphics; decoding the encoded media; and displaying the decoded media together with the programmatically generated graphics on a display of the sink device. In some embodiments, the programmatically generated graphics overlay the displayed decoded media when displayed on the display of the sink device. In some embodiments, the encoded media comprises images, video, or a combination of images and video. In some embodiments, the graphics resources are stored in memory on the sink device.

In accordance with further aspects of the present disclosure, there are provided wireless communication devices, comprising: a processor; and a memory coupled to the processor and storing instructions which configure the processor for performing the methods described in the present disclosure.

In accordance with yet further aspects of the present disclosure, there are provided non-transitory computer-readable mediums which store instructions for execution by a processor to implement methods described in the present disclosure.

Example Network Configuration

Figure 1A:
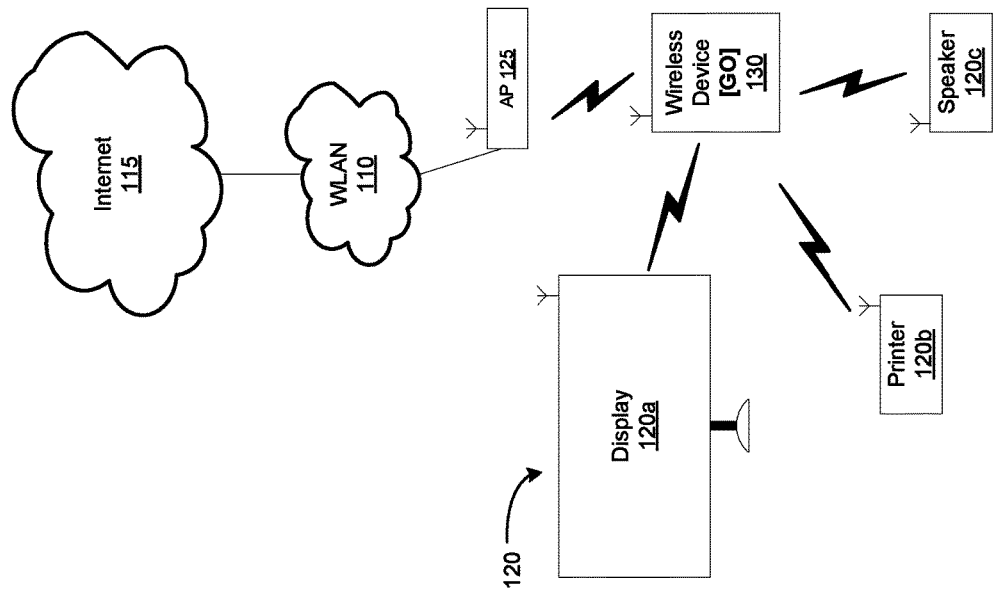
FIG. 1A illustrates an example environment within which the techniques of the present disclosure can be practiced.

To illustrate one environment within which the techniques of the present disclosure may be practiced, FIG. 1A illustrates a wireless communication device 130 (hereinafter "wireless device" for convenience) which may communicate with wireless communication devices 120a, 120b and 120c (120 collectively) and an access point (AP) 125. Certain adaptations and modifications of the described embodiments can be made. Therefore, the above described embodiments are considered to be illustrative and not restrictive. The wireless device 130 may communicate with one or more wireless communication networks. For example, wireless device 130 may communicate with a wireless local area network (WLAN) 110 operating in accordance with IEEE 802.11 standards, or other WLAN standards, and the Internet 115 via AP 125.

The wireless device 130 additionally or alternatively communicates using wireless peer-to-peer communication techniques, for example, in accordance with the Wi-Fi Direct technical specification (also known as Wi-Fi Peer-To-Peer ("Wi-Fi P2P") technical specification) and/or be certified as a Wi-Fi Direct device. The wireless device 130 may establish a Wi-Fi P2P wireless connection with a display device 120a (or monitor) which includes a wireless transceiver. Such a Wi-Fi P2P wireless network connection may be suitable for applications such as, for example, a streaming media application, or a display or presentation application. The wireless device 130 may additionally or alternatively establish a Wi-Fi P2P wireless network connection with a printer 120b which includes a wireless transceiver. Such a Wi-Fi P2P wireless network connection may be suitable for applications such as, for example, a print application, or a facsimile application. Even further, the wireless device 130 may additionally or alternatively establish a Wi-Fi P2P wireless network connection with a speaker 120c which includes a wireless transceiver. When the wireless device 130 is connected as such, using one or more Wi-Fi P2P wireless network connections, data may be communicated "directly" between the wireless device 130 and the other devices 120 (i.e., without the data traversing any fixed wireless network infrastructure).

Wi-Fi P2P wireless networks may include a P2P wireless device which is designated as a group-owner (GO) to serve some functions of an AP, such as, broadcasting beacon frames and allocating wireless channel resources. The GO may maintain multiple concurrent network connections in an active state, for example, with multiple devices, including the wireless devices 120 and the AP 125. In FIG. 1A, the wireless device 130 acts as a group-owner.

The wireless device 130 may be additionally configured to access communication services via a Public Land Wireless Network (PLWN) (not shown), such as a cellular telecommunications network. For communication with PLWNs, the wireless device 130 may be configured in accordance with one or more cellular telecommunication standards, such as Global Systems for Mobile (GSM), General Packet Radio Service (GPRS), Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

FIG. 1B illustrates a second environment within which the techniques of the present disclosure may be practiced. In FIG. 1B, the display device 120a acts as a group-owner. The display device 120a may maintain a network connection in an active state, for example, with multiple devices, including the wireless device 130 and the AP 125, concurrently. The display device 120a may connect to the Internet 115 via the AP 125.

Example Display Device

Figure 2:
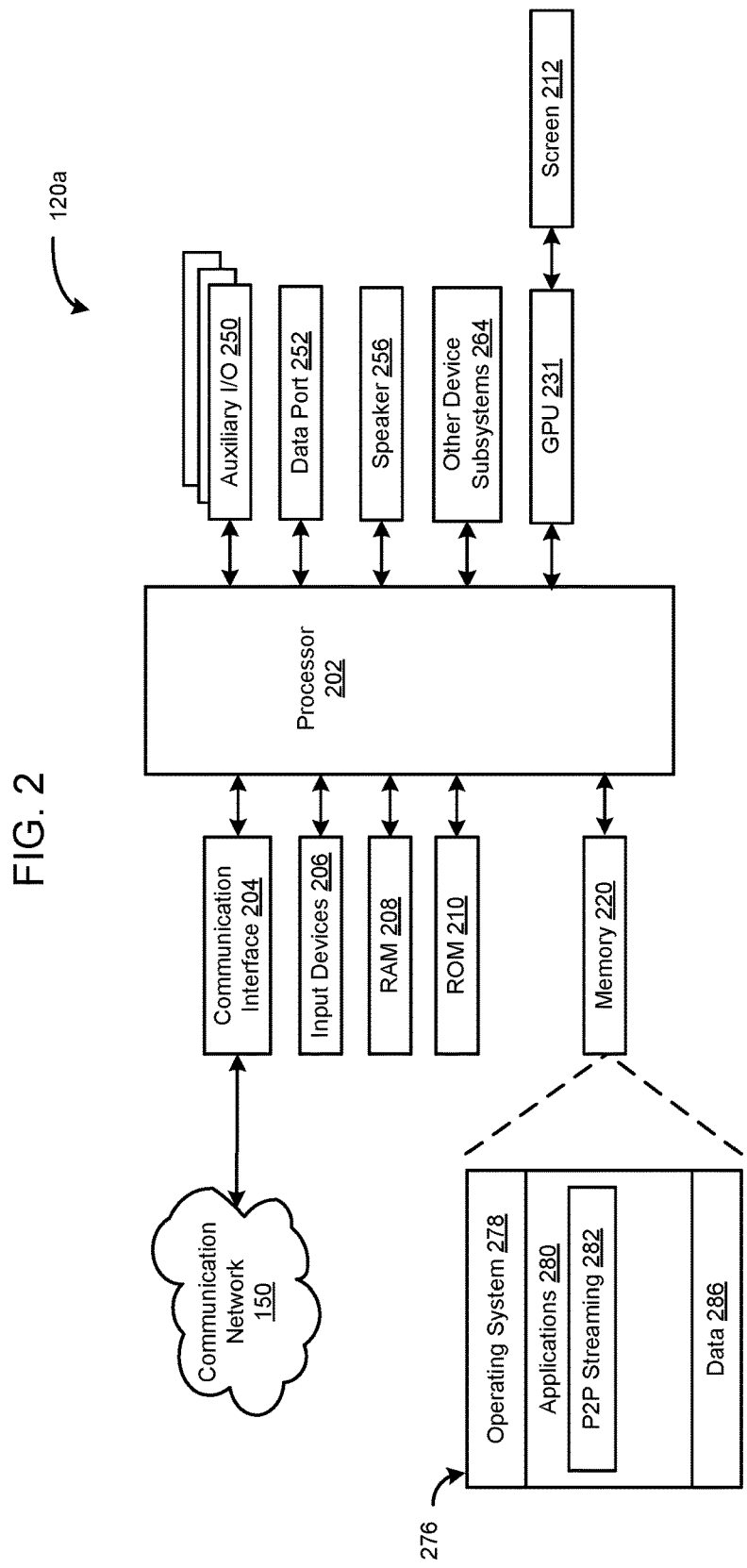
FIG. 2 illustrates in block-diagram form a display device suitable for displaying display frames in accordance with example embodiments of the present disclosure.

Reference is next made to FIG. 2 which shows in block-diagram form an example of the display device 120a suitable for displaying real-time streaming media, such as video and presentations in accordance with example embodiments of the present disclosure. The display device 120a may be any one of a television, a projector, a computer monitor, an adaptor coupled to a display, or other device suited for displaying information on a display screen.

The display device 120a includes a rigid case (not shown) housing the electronic components of the display device 120a. The electronic components of the display device 120a are mounted on a printed circuit board (not shown). The display device 120a includes a processor 202 which controls the overall operation of the display device 120a and a communication interface 204 for communicating with other devices via a communication network 150. The communication network 150 may be the network shown in FIG. 1A or 1B, or other suitable communication network.

The processor 202 interacts with other components, such as one or more input devices 206 such as a keypad, buttons, or touch sensitive bezel, Random Access Memory (RAM) 208, Read Only Memory (ROM) 210, a graphics processing unit (GPU) 231, a display screen 212 (via the GPU 231), persistent (non-volatile) memory 220 which may be flash erasable programmable read only memory (EPROM) memory ("flash memory") or any other suitable form of memory, auxiliary input/output (I/O) subsystems 250, one or more data ports 252 such as a serial data port (e.g., Universal Serial Bus (USB) data port and High-Definition Multimedia Interface (HDMI) data port, a speaker 256, and other device subsystems generally designated as 264. The components of the display device 120a are coupled via a communications bus (not shown) which provides a communication path between the various components.

The processor 202 operates under stored program control and executes software modules 276 stored in memory, for example, in the persistent memory 220. The persistent memory 220 stores data 286 such as user data. As illustrated in FIG. 2, the software modules 276 comprise operating system software 278 and software applications 280. The software applications 280 include a P2P streaming application 282. The software modules 276 or parts thereof may be temporarily loaded into volatile memory such as the RAM 208. The RAM 208 is used for storing runtime data variables and other types of data or information. Although specific functions are described for various types of memory, this is merely one example, and a different assignment of functions to types of memory could be used.

The GPU 231 provides specialized processing of GPU drawing commands. The GPU 231 interfaces with the processor 202 to receive GPU drawing commands from the processor 202, as the processor 202 off-loads processing of GPU drawing commands to the GPU 231 for enhanced efficiency. The processor 202 may send GPU drawing commands to the GPU 231 directly, or using a graphics application programming interface (API), such as, without limitation, OpenGL® or DirectX®. The API provides for more efficiency, by allowing an application (e.g., P2P streaming application 282) requesting a GPU drawing command to request only a high-level command to achieve the same function of numerous low-level commands. For example, the OpenGL command "rotateX(angle)" rotates an object around the X-axis by the specified angle. The OpenGL API translates the command into instructions for the GPU 231 to process. Furthermore, the OpenGL API and other graphics APIs allow for the application to be written only once for multiple GPUs, as the API provides a different translation in dependence on the GPU. The GPU 231, once processing of the GPU drawing command is complete, defines pixel information, which is used by the screen 212 to produce an image on the screen 212. When numerous GPU drawing commands are processed in sequence by a GPU, such as GPU 231, highly visual graphics are displayed on the screen 212.

The GPU 231 may either be a separate unit or may be combined with the processor into the same unit. For example, the GPU 231 may be implemented on an individual integrated circuit (IC) or may be implemented using a system on chip (SoC) architecture, whereby both the GPU 231 and the processor 202 are implemented on the same IC. Additionally, in some embodiment, the processor 202 performs the functions of the GPU 231 in addition to other processing functions.

The display screen 212 may be provided as part of a touchscreen which provides an input device 206. The display screen 212 which together with a touch-sensitive overlay (not shown) operably coupled to an electronic controller (not shown) comprise the touchscreen. User-interaction with a GUI (graphical user interface) is performed through the input devices 206. Information, such as text, characters, symbols, images, icons, and other items are rendered and displayed on the display screen 212 via the processor 202.

The communication interface 204 may include a short-range wireless communication subsystem (not shown) which provides a short-range wireless communication interface. The short-range wireless communication interface may be configured in accordance with one or more cellular telecommunication standards, including any one of a Bluetooth® standard, an IEEE 802.11 standard, an IEEE 802.15.3a standard (also referred to as UltraWideband (UWB)), a Z-Wave standard, a ZigBee standard or other suitable short-range wireless communication standard. The communication interface 204 may provide an infrared (IR) interface such as an Infrared Data Association (IrDA) interface to receive communication from a remote control unit (not shown) for controlling operation of the display device 120a.

The P2P streaming application 282 configures the display device 120a to display information received via the communication interface 204 over a P2P wireless network, such as a Wi-Fi P2P wireless network, on the display screen 212. The information may be processed in real-time or near real-time, and may include video, audio, pictures, text, any combination of audio, pictures and text, or other media or multimedia. In some embodiments, the P2P streaming application 282 enables the display device 120a to act as an external display device or monitor for a connected computing device such as the wireless device 130, including cloning another display device such as the display screen of the wireless device 130, or acting as a primary display device or monitor for the connected computing device. The P2P streaming application 282 may additionally or alternatively receive audio from the wireless device 130 as part of the real-time or near real-time information, which may be reproduced using the speaker 256 of the display device 120a or an external speaker (not shown) coupled directly or indirectly to the display device 120a.

The P2P streaming application 282 may run in the background, concurrently with another application, such as a TV application (not shown). Accordingly, the P2P streaming application 282 may be triggered upon detecting a new P2P connection has been established with a device supporting P2P streaming, such as the wireless device 130.

Example Wireless Device

Figure 3:
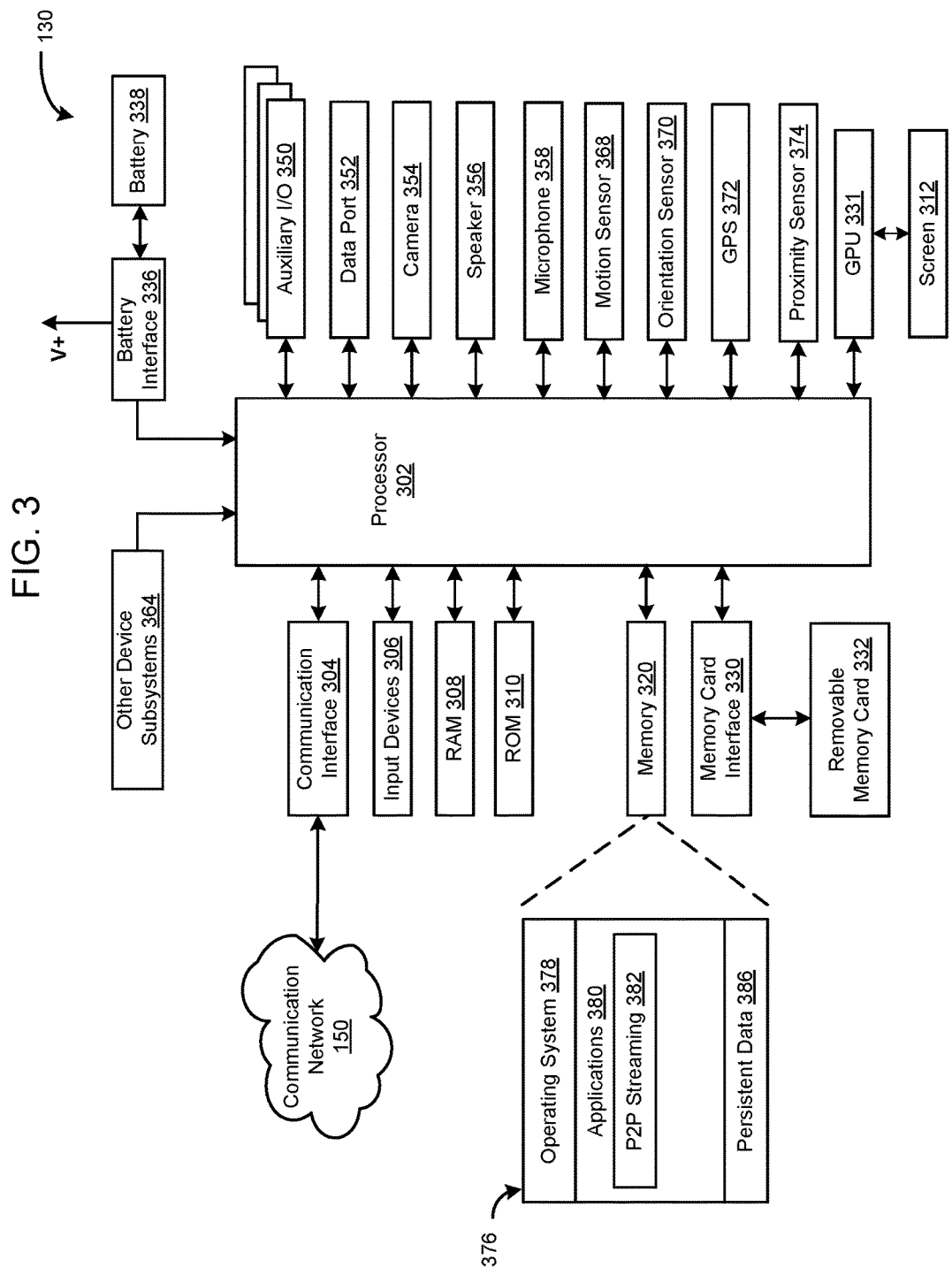
FIG. 3 illustrates in block-diagram form a wireless communication device suitable for transmitting display frames to the display device of FIG. 2 in accordance with example embodiments of the present disclosure.

Reference is next made to FIG. 3 which illustrates a mobile wireless device 130 suitable for communicating with the display device 120a in accordance with example embodiments of the present disclosure. Examples of the wireless device 130 include, but are not limited to, a mobile phone, smartphone or superphone, tablet computer, notebook computer (also known as a laptop, netbook or ultrabook computer depending on the device capabilities), wireless organizer, personal digital assistant (PDA), mobile gaming device, special purpose digital camera or wearable computer such as a smartwatch or head-mounted display (HMD) such as Google Glass™ from Google Inc.

The wireless device 130 includes a rigid case (not shown) housing the electronic components of the wireless device 130. The electronic components of the wireless device 130 are mounted on a printed circuit board (not shown). The wireless device 130 includes a processor 302 which controls the overall operation of the wireless device 130. Communication functions, including data and voice communication, are performed through a communication interface 304. The communication interface 304 receives messages from and sends messages via the communication network 150. The communication interface 304 typically includes a WWAN interface for communication over cellular networks and a WLAN interface for communication over Wi-Fi networks.

The processor 302 interacts with other components including one or more input devices 306 such as a keyboard and/or touchscreen, RAM 308, ROM 310, a graphics processing unit (GPU) 331, a display screen 312 (via the GPU 331), persistent (non-volatile) memory 320 which may be flash memory or any other suitable form of memory, auxiliary I/O subsystems 350, one or more data port 352 such as serial data port (e.g., USB data port), a camera 354 such as video and/or still camera, a speaker 356, a microphone 358, a motion sensor 368 which enables to processor 302 to determine whether the wireless device 130 is in motion and the nature of any sensed motion at any appropriate time, an orientation sensor 370 which enables the processor 302 to determine which direction the wireless device 130 is pointed at any appropriate time, a global positioning system (GPS) device 372 which enables the processor 302 to determine GPS coordinates (i.e., location) of the wireless device 130 at any appropriate time, proximity sensor 374 which enables the processor 302 to determine the distance between the wireless device 130 and an object at any appropriate time, and other device subsystems generally designated as 364. The components of the wireless device 130 are coupled via a communications bus (not shown) which provides a communication path between the various components.

The processor 302 operates under stored program control and executes software modules 375 stored in memory, for example, in the persistent memory 320. The persistent memory 320 stores data 386 such as user data, user information, and information regarding the components and technical capabilities of the wireless device 130. As illustrated in FIG. 3, the software modules 376 comprise operating system software 378 and software applications 380. The software applications 380 may include a P2P streaming application 382. The software modules 376 or parts thereof may be temporarily loaded into volatile memory such as the RAM 308. The RAM 308 is used for storing runtime data variables and other types of data or information. Although specific functions are described for various types of memory, this is merely one example, and a different assignment of functions to types of memory could be used.

The processor 302 off-loads processing of GPU drawing commands to the GPU 331. The GPU 331 is coupled to the processor 302, thereby receives GPU drawing commands from the processor 302, and is also coupled to the display screen 312, thereby outputting the result of the GPU drawing commands to the display screen 312. The GPU 331 may either be a separate unit or may be combined with the processor into the same unit. For example, the GPU 331 may be implemented on an individual integrated circuit (IC) or may be implemented using a system on chip (SoC) architecture, whereby both the GPU 331 and the processor 302 are implemented on the same IC. Additionally, in some embodiment, the processor 302 performs the functions of the GPU 331 in addition to other processing functions.

The display screen 312 may be provided as part of a touchscreen which provides an input device 306. The display screen 312 which together with a touch-sensitive overlay (not shown) operably coupled to an electronic controller (not shown) comprise the touchscreen. User-interaction with a GUI is performed through the input devices 306. Information, such as text, characters, symbols, images, icons, and other items are rendered and displayed on the display screen 312 via the processor 302. The processor 302 may interact with the orientation sensor 370 to detect direction of gravitational forces or gravity-induced reaction forces so as to determine, for example, the orientation of the wireless device 130 in order to determine a screen orientation for the GUI.

The input devices 306 may include a keyboard, control buttons (not shown) such as a power toggle (on/off) button, volume buttons, camera buttons, general purpose or context specific buttons, 'back' or 'home' buttons, phone function buttons, and/or a navigation device. When the display screen 312 is provided as part of a touchscreen, the various buttons or controls may be provided by onscreen user interface elements displayed on the display screen 312 instead of, or in addition to, physical interface components. The keyboard may be provided instead of, or in addition to, a touchscreen depending on the embodiment. At least some of the control buttons may be multi-purpose buttons rather than special purpose or dedicated buttons.

The wireless device 130 may include a memory card interface 330 for receiving a removable memory card 332 comprising persistent memory, such as flash memory. A removable memory card 332 can be inserted in or coupled to the memory card interface 330 for storing and reading data by the processor 302 including, but not limited to still images and optionally video images. Other types of user data may be stored on the removable memory card 332. Other types of removable digital image storage media, such as magnetic hard drives, magnetic tape, or optical disks, may be used in addition to, or instead of, the removable memory card 332.

The communication interface 304 may include a short-range wireless communication subsystem (not shown) which provides a short-range wireless communication interface. The short-range wireless communication interface may be configured in accordance with one or more cellular telecommunication standards, including any of a Bluetooth® standard, an IEEE 802.11 standard, an IEEE 802.15.3a standard (also referred to as UWB), a Z-Wave standard, a ZigBee standard or other suitable short-range wireless communication standard.

A received signal, such as a text message, an e-mail message, or web page download, is processed by the communication subsystem 304 and input to the processor 302. The processor 302 processes the received signal for output to the display screen 312 and/or to the auxiliary I/O subsystem 350. A subscriber may generate data items, for example e-mail messages, which may be transmitted over the communication network 150 through the communication subsystem 304, for example.

The motion sensor 368 may comprise an accelerometer (such as a three-axis accelerometer) or other suitable motion sensor. The orientation sensor 382 may comprise an accelerometer (such as a three-axis accelerometer), electronic compass, gyroscope, or a combination thereof. Other suitable orientation sensors could be used instead of, or in addition to, the accelerometer, electronic compass, and gyroscope. The motion sensor 368 and orientation sensor 382, or parts thereof, may be combined or shared, for example, within an integrated component. The processor 302, or controller (not shown) of a three-axis accelerometer, can convert acceleration measurements into device orientations.

The proximity sensor 374 may comprise a sensor that transmits a field or signals (such as electromagnetic) to detect the presence of nearby objects (i.e., the sensor's target). The maximum distance that the proximity sensor 374 can detect is may be predetermined or adjustable. The processor 302 can utilize this information to determine the distance between the wireless device 130 and the target object to be captured in an image.

The wireless device 130 includes a battery 338 as a power source, which is typically one or more rechargeable batteries that may be charged, for example, through charging circuitry coupled to a battery interface such as the serial data port 352. The battery 338 provides electrical power to at least some of the electrical circuitry in the wireless device 130, and the battery interface 336 provides a mechanical and electrical connection for the battery 338. The battery interface 336 is coupled to a regulator (not shown) which provides power V+ to the circuitry of the wireless device 130.

The P2P streaming application 382 configures the wireless device 130 to initiate communication with an external wirelessly coupled display, such as display device 120a. The display device 120*a* is coupled using an established wireless P2P communication session. Data, representative of encoded display frames, is sent to the display over the wireless P2P network via the communication interface 304. The display device 120*a* then decodes and/or processes the received encoded display frames to produces images on the screen 212 of the display device 120*a*. The images produced on the screen 212 may include, with any limitations, any one of, or any combination of video, pictures, text, and computer graphics. The images produced may correspond to data files stored in the memory 320 of the wireless device 130, for example as persistent data 386, or on a removable memory card 332, or to data retrieved from the Internet 115 by the wireless device 130 in real-time or near real-time, or may be generated by the processor 302 or the GPU 331. The encoded display frames may be decoded and/or processed at the display device 120*a* in real-time or near real-time.

The P2P streaming application 382 operates in any one of at least two modes, without limitation, as selected by a user via a user interface. The first mode is an "extended screen" mode, whereby the images displayed on the screen 212 of the display device 120*a* are different from the images displayed on the screen 312 of the wireless device 130. The second mode is a "screen cloning" mode, whereby the images displayed on the screen 312 are reproduced identically, or almost identically, on the screen 212. In both modes, the P2P streaming application 382 may additionally or alternatively transmit audio from the wireless device 130.

The P2P streaming application 382 may run in the background, concurrently with another application, such as an Internet video-streaming application (e.g., YouTube®). Accordingly, the P2P streaming application 382 may be triggered upon detecting launch of the video streaming application.

Session Establishment

Figure 4:
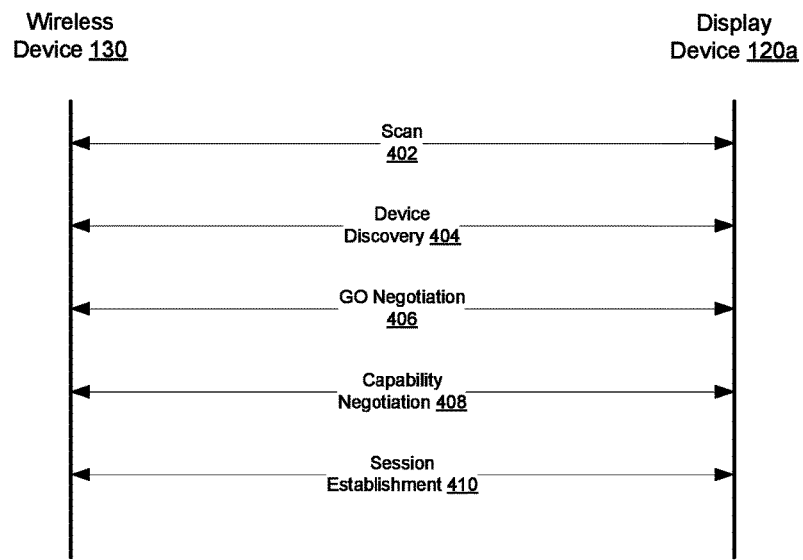
FIG. 4 illustrates a flow-diagram of communication between the wireless communication device of FIG. 3 and the display device of FIG. 2 to establish a peer-to-peer session to allow for wireless transmission of real-time media between the two devices.

Prior to wireless transmission of display frames, a P2P communication session is typically established between the wireless device 130 and the display device 120*a*. FIG. 4 illustrates an example flow-diagram of communication between the wireless device 130 and the display device 120*a* to establish a P2P communication session for wireless transmission of display frames between the two devices. The flow-diagram of FIG. 4 provides only a high-level illustration of steps and messages that may be communicated to establish a session. Various other steps may be implemented and various other messages may be communicated. Additionally, the order of the steps and messages is only illustrative and is non-restrictive.

The wireless device 130 and the display device 120*a* may be configured to scan for other P2P available devices at 402. The wireless device 130 and the display device 120*a* may receive an instruction to scan from a user via input received via a user interface of the wireless device 130 or the display device 120*a*, or may be programmed to perform a scan when a pre-determined condition is detected. The pre-determined condition may be the launch of a particular application, such as a video application. The scanning procedure allows the devices 130, 120*a* to discover each other at 404, and negotiate parameters for selection of a wireless channel, such as a channel number.

After the devices 130, 120*a* have discovered each other, the devices 130, 120*a* may enter into a group-owner (GO) negotiation phase at 406. The GO negotiation allows for the selection of one of the devices 130, 120*a* acting as a GO to perform functions similar to that of an AP in a traditional Wi-Fi network. The selection of the GO may be based on many factors, including factors related to IT policy, the available services, interference with other wireless devices and the ability to access other networks. Typically, when only one device of device 130, 120*a* is a battery-constrained device, the battery-constrained device is selected as the GO. The GO may select and establish a Notice-of-Absence (NoA) schedule defining "absence" periods during which the GO may enter an inactive state, such as a low-power state in which wireless communication functions are suspended. The NoA schedule may be broadcast in a beacon frame by the GO at regular intervals. The NoA schedule defines a time-allocation for each device to transmit over the wireless channel using four parameters: (1) a time-duration parameter, specifying the length of each absence period; (2) a time-interval parameter, specifying the time between consecutive absence periods; (3) a start-time, specifying the starting time of the first absence period after the current beacon frame; and (4) a count of the number of absence periods in the current schedule. At the end of each absence period, the GO returns to an active state from the inactive state, for example, when changing from the low-power state to a higher-power state, such as a normal operating state. The GO may adjust the NoA schedule at any time. In some embodiments, a particular NoA schedule is chosen to minimize latency while satisfying throughput and power consumption requirements.

After the devices 130, 120*a* have discovered each other, the devices 130, 120*a* may enter into a device capability negotiation phase at 408. The device capability negotiation may include exchanging messages providing details of supported encoding schemes and standards and/or other device capability information.

During the device capability negotiation phase, the devices 130, 120*a* identify a maximum average throughput which the devices 130, 120*a* can both support due to hardware limitations associated with the wireless device 130 and/or the display 120*a*. The hardware limitations may directly affect the ability of the wireless device 130 to process and output real-time (or near real-time) media and for the display 120*a* to process and display the display frames without interruptions. The hardware limitations add latency to the system which may delay the display of one or more display frame on the screen 212 of the display device 120*a*. This may be considered to be unacceptable, as each frame has a specific time at which it should be displayed, to ensure continuity of the display frames.

A session may be established between the wireless device 130 and the display device 120*a* after completing the negotiation at 410. The devices may in some embodiments use a Real Time Transport Protocol (RTP) over Transmission Control Protocol (TCP) or User Datagram Protocol (UDP) as the communication protocol for sending and receiving data packets during the session. Accordingly, the wireless device 130 may prepare the display frames for transmission by encapsulating the display frames into data packets using the negotiated compression parameters and encapsulate the encoded data packets into a data frame, as described with reference to FIGS. 6 and 7.

Example GPU

Figure 5:
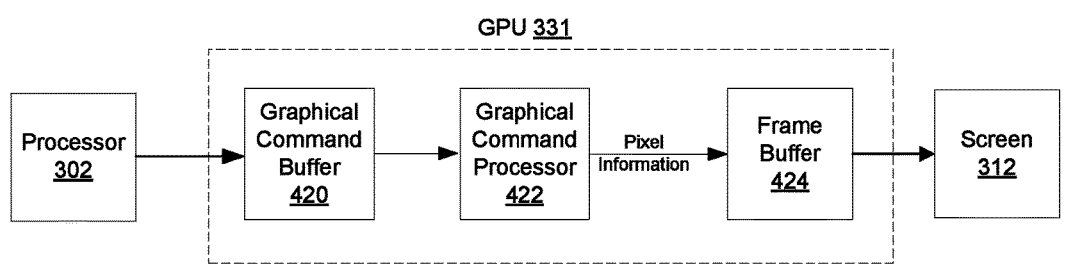
FIG. 5 illustrates in block-diagram form example graphical processing unit for use in the wireless communication device of FIG. 3.

Reference is now made to FIG. 5, showing a functional block diagram of the GPU 331 of the wireless device 130. In some embodiments, the GPU 331 is used in preparing the display frames for transmission. The GPU 331 provides specialized processing of GPU drawing commands and is similar to GPU 231 of the display device 120*a*.

When the processor 302 of the wireless device 130 executes an application 380, such as the P2P streaming application 382, the processor 302 off-loads processing of the GPU drawing commands to the GPU 331 for enhanced efficiency. The GPU drawing commands are typically generated using a graphics API, as previously described.

The processor 302 places the GPU drawing command into a GPU drawing command buffer 420 for processing by the GPU 331. The buffer 420 is typically implemented using a First-In, First-Out (FIFO) architecture. The first GPU command is processed by a GPU drawing command processor 422 to generate pixel information. The pixel information defines a display frame suitable for display on the screen 312 of the wireless device 130 by defining pixels for display on the screen for a single moment in time. The pixel information is placed on a frame buffer 424 which interfaces with the screen 312. The pixel information is updated regularly to ensure the image displayed on the screen 312 is representative of the processing performed by the processor 302.

In some embodiments, the frame buffer 424 also interfaces with the P2P streaming application 382 to allow for the "screen cloning" mode. For example, the OpenGL API command "glReadPixels" returns pixel data from the screen buffer 424. Additionally, the same command may return only the pixel data within a specified location on the screen 312.

When the GPU drawing commands correspond to a graphics API, any GPU drawing commands generated by an application 380 running on the wireless device 130 can also be processed by the GPU 231 of the display device 120a. Accordingly, the P2P streaming application 382 may send GPU drawing commands from the wireless device 130 to the display device 120a. When the GPU drawing commands are received at the display device 120a, the GPU 231 processes the commands and generates the pixel information that the GPU 331 would generate. Accordingly, the P2P streaming application 382 may send display frames to the display device 120a by either sending the pixel information, as processed by the GPU 382 at the wireless device 130, or by sending the GPU drawing commands for processing by the GPU 282 at the display device 120a. As described in greater detail in the present disclosure, the pixel information is typically compressed using a video encoding scheme prior to sending to the display device 120a. Additionally, for some display frames, as described in greater detail in this disclosure, the P2P streaming application 382 may be limited from sending the pixel information to the display device 120a using the GPU drawing commands.

When operating in the "extended screen" mode, the P2P streaming application 382 may send either the GPU drawing commands or the pixel information (for example, as compressed in accordance with the present disclosure) to the display device 120a. When the GPU drawing commands are sent to the display device 120a, only the GPU 282 of the display device 120a processes the GPU drawing commands, as the images displayed on each of the screens 212 and 312 are different. Alternatively, only the GPU 382 of the device 130 processes the GPU drawing commands; however, the pixel information produced by the GPU 382 is not displayed on the screen 312 of the device 130. Instead, the pixel information is sent to the display device 120a and displayed only on the screen 212. In another embodiment, the pixel information produced by the GPU 382 includes partial information suited for display on both the screen 212 and the screen 312. Such partial information may represent a limited area of the screen 212 and/or 312. For example, in a presentation application, an additional menu can be displayed on the screen 312 that is displayed on the screen 212.

When operating in the "screen cloning" mode, the P2P streaming application 382 may also send either the GPU drawing commands or the pixel information to the display device 120a. When the GPU drawing commands are sent to the display device 120a, both the GPU 382 and the GPU 282 process the same GPU drawing commands. Thus, the same image is displayed on the screen 212 of the display device 120a and the screen 312 of the wireless device 130. Alternatively, only the GPU 382 processes the GPU drawing commands and generates pixel information corresponding to the GPU drawing commands. The pixel information, as generated by the GPU 382 of the device 130, is then sent to the display device 120a for display on the screen 212 and to the screen 312.

Accordingly, in some embodiments, a single display frame may be encoded either using pixel information or GPU drawing commands for sending to an external wirelessly coupled display, such as display device 120a. Additionally, in some embodiments as will be described, a single display frame may be encoded using a combination of both the pixel information and the GPU drawing commands. In other words, a single display frame may be split into two (or more) portions, and each portion defined using a different encoding scheme.

Many factors are considered when determining which encoding scheme to use for each display frame. The encoding scheme is selected such that the display device 120a is operable to decode the encoded display frame for display on the screen 212, on the basis of information exchanged in the device capability negotiation phase at 408 of FIG. 4. Additionally, the encoding scheme may also be selected on the basis of the data type of the information encoded in the display frame. GPU drawing commands provide relative high efficiency in encoding of programmatically generated graphics, including, without limitation, user interfaces, computer games, and images created using vector graphics. However, the GPU drawing commands cannot be used to represent encoded media including, without limitation, images and videos. Accordingly, when display frames include portions of both programmatically generated graphics and encoded media, each portion may be encoded in different encoding schemes.

Additionally, in a stream of display frames, successive frames may employ different encoding schemes. In one example, a user utilizes a user interface menu to play a video, and then enlarges the video to occupy the complete area of the screen. A first display frame, showing the user interface menu, is encoded using GPU drawing commands 503. A subsequent second display frame, including both the user interface menu and the video, is then encoded using a combination of both pixel information 502 and GPU drawing commands 503. A subsequent third display frame, including only the video, is encoded using only pixel information 502.

Figure 6:
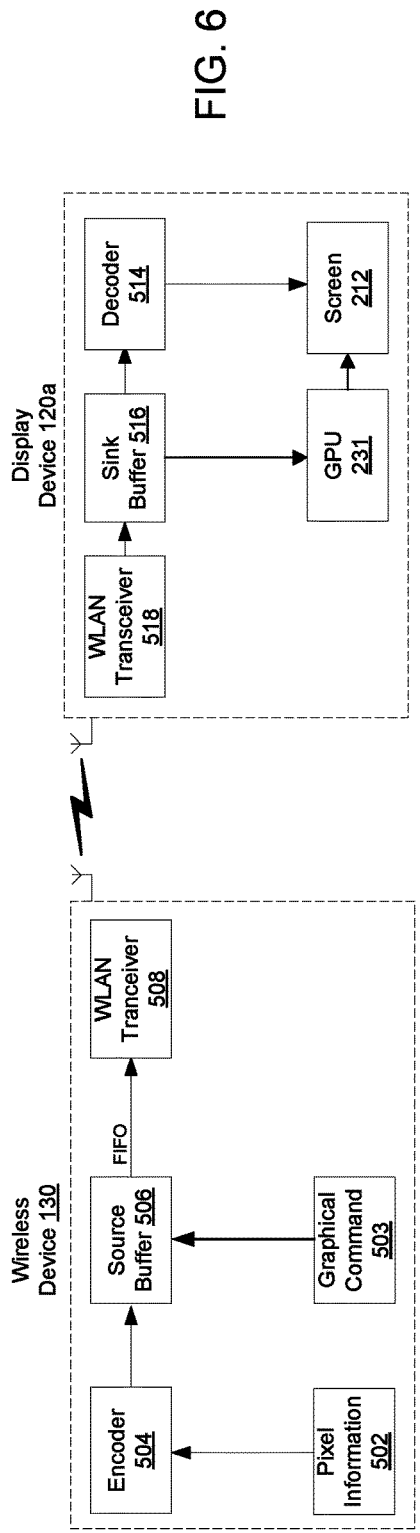
FIG. 6 illustrates in block-diagram form example components of the wireless communication device of FIG. 3 and the display device of FIG. 2 for transmission of the display frames in accordance with example embodiments of the present disclosure.

FIG. 6 illustrates a functional block-diagram of an example embodiment implemented by the wireless device 130 for preparing a display frame or a stream of display frames for transmission, and of an example embodiment implemented by the display device 120a for receiving the encoded display frame and preparing the encoded display frame for display on the display screen 212. The block-diagram of FIG. 6 provides only a high-level functional illustration of components and steps used. Various other components and steps may be used. Additionally, the order of the steps is only illustrative and is non-restrictive. The various components shown may be implemented as hardware-only components, for example, using integrated circuit fabrication. The various components may also be implemented as software-only components, residing in memory and implemented by a processor. Additionally, the various components may also be implemented using a combination of hardware and software components. For example, a dedicated hardware media encoder, built using integrated circuit fabrication, may be controlled by software algorithms, for example, firmware. Accordingly, the various blocks are only illustrative functional blocks.

The wireless device 130 accordingly acts as a "source" of display frames for the display device 120*a*, whereas the display device 120*a* acts as a "sink" for the display frames received from the wireless device 130. The wireless device 130 may be referred to as a "source", and the display device 120*a* may be referred to as a "sink". Other types of devices may function as a "sink". For example, a speaker 120*c* may receive audio content. Accordingly, the display device 120*a* may be replaced with the speaker 120*c* (FIG. 1A) in some embodiments. The P2P streaming application 382 or other similar application may control various aspects of transmission of the display frames, such as, controlling which content to transmit.

As illustrated in FIG. 6, the wireless device 130 encodes and transmits a display frame to the display device 120*a*. A stream of display frames may also be transmitted from the wireless device 130 to the display device 120*a*. Each display frame can visually represent any number of data files stored on the wireless devices, or any programmatically generated graphics. Additionally, each display frame has a deadline for displaying the display frame on the display device 120*a*. When the deadline of most display frames is met, then the transmission is said to occur in real-time or near real-time. When the deadline of most display frames is not met, then the user experience is typically negatively affected, as the images displayed on the display device 120*a* are delayed.

Each display frame may be encoded using any one of screencasting (e.g., video-compression scheme providing compression of the pixel information 502), GPU processing using graphics resources and a set of GPU drawing commands 503, and GPU processing with media streaming such as DLNA. At the device capability negotiation phase (step 408 of FIG. 4), the wireless device 130 and the display device 120*a* exchange information to determine which display frame encoding schemes are supported by both devices. Only encoding schemes supported by both devices are later considered and used to transmit the display frames.

When a display frame is encoded using a video encoding scheme, the processor 302 sends pixel information 502 to the encoder 504 for compression and/or encoding. The encoding and/or compression is/are generally based on a protocol suitable for sending to the display device 120*a* over a wireless communication channel. The display device 120*a* includes a decoder 514 that is operable to decode the encoded frame for display on the screen 212 of the display device 120*a*. The encoder 504 compresses the pixel information 502 using a video encoding scheme to reduce the throughput to transmit the display frames in real-time or near real-time in accordance with the available bandwidth over the wireless communication channel.

Typically, only the compressed pixel information 502 is transmitted wirelessly. The pixel information, as produced in the frame buffer 424, is routinely used to send display frames to local screens, i.e., screens coupled to the frame buffer 424 via a wired communication bus (e.g., on a PCB, or through a cable). However, sending pixel information, as produced in the frame buffer 424, over a wireless communication channel is taxing since the wireless communication channel may not provide sufficient throughput. Additionally, a wireless communication channel is more error prone than a wired communication bus, for example, due to interference and reduced signal-to-noise ratio. Accordingly, the pixel information is encoded using a video encoding scheme, as will be described, on the wireless device 130. The encoded pixel information (i.e., using the video encoding scheme) is then sent. The use of the video encoding scheme helps ensure the deadline associated with each display frame is satisfied. Additionally, the video encoding scheme may be adapted in correspondence with the available wireless bandwidth. In other words, the wireless device 130 may monitor the wireless communication channel, and if a reduced throughput is detected, the video encoding scheme is adapted accordingly by utilizing more compression.

The compression scheme employed by the encoder 504 may be in accordance with the H.264 video encoding standard. The pixel information 502 is encoded into a plurality of Groups of Pictures (GOPs), where each GOP has a set of frames. The GOP structure allows for compression of display frames by using different types of video frames, each providing different levels of compression. Each display frame is thus comprised of multiple video frames. Each GOP includes only one key-frame providing a full representation of an image associated with the frame. Redundancy in the video-stream is removed by including predicted-frames in the GOP, which only include difference information from reference-frames, such as the key-frame. Accordingly, for a given GOP, the more predicted-frames present, the greater the compression. However, using too many predicted-frames may reduce the quality of the display frames as received at the display device 120*a*, as less scene information is included in the compressed stream. For example, when a scene of video changes, i.e., the entire background is changed, a new key-frame may be included.

When the H.264 video encoding standard is used, information exchanged during the device capability negotiation phase (at step 408 of FIG. 4) is used to determine the parameters of the compression. For example, the devices 130, 120*a* may exchange information regarding supported profiles and/or levels. Each profile defines a particular set of features to be supported, and each profile is tailored to a specific class of applications. For example, the Constrained Baseline Profile (CBP) defines a low-cost set of features, suitable for videoconferencing and mobile applications. In another example, the High Profile (HiP) supports high-definition television applications. Example features that are supported by HiP but not CBP include: 10 bit sampling; interlaced coding; and quantization scaling matrices. Additionally, each level may include definitions of: maximum decoding speed; maximum frame size; maximum video bit rate for coding; and maximum resolution. Accordingly, to support a particular profile and level, a particular set of hardware and software performance requirements may be needed.

A profile may be selected based on the type of media being transmitted. For example, when transmitting a movie for display on the display 120*a*, the HiP may be selected. However, the level may be selected based on hardware limitations associated with either of the devices 130, 120*a*. In one embodiment, the level selected may be the level providing the maximum image and/or video quality given the hardware performance constraints of the devices. In another embodiment, the level selected may be the level providing the maximum battery life for the devices 130, 120*a*.

In one embodiment, the hardware limitation is a buffer limitation of the display 120*a* for storing received data from the wireless device 130 or a decoder limitation of a decoder of display 120a for decoding received data from the wireless device 130. In another embodiment, the hardware limitation is a buffer limitation of a buffer of the wireless device 130 for storing data for sending to the display 120a or an encoder limitation of an encoder of the wireless device 130 for encoding data for sending to the display 120a. In another embodiment, the decoder and/or the buffer limitations may be dependent on the software implementation of the decoder and buffer respectively. For example, if a more efficient algorithm is used by the decoder, the hardware limitations associated with the decoder may be reduced.

The wireless transmission may be implemented using the Miracast™ standard, a peer-to-peer wireless screencast standard formed via Wi-Fi Direct® connections. Miracast enables wireless delivery of compressed standard or high-definition video to or from electronic devices. Typically, both the sending and receiving devices should be Miracast certified. However, Miracast adapters which plug into an expansion port, such as an HDMI port, are available which allow streaming to a non-certified device. Miracast allows a portable device or computer to securely send up to 1080p HD video and 5.1 surround sound (AAC and AC3 are optional codecs, mandated codec is LPCM—16 bits 48 kHz 2 channels).

Within a GOP, a first frame type of the different types, the Intra-Frame ("I-Frame" or "I" for short) includes full image information, and may be used as a reference-frame. Accordingly, the I-Frame is the key-frame and is the largest frame, in terms of data size. Thus, the I-Frame requires the longest transmission time. A second frame-type is the Predicted-Frame ("P-Frame" or "P" for short), and is based on the closest preceding I-Frame or P-Frame, and may be used as a reference-frame. A P-Frame typically requires much less disk space than an I-Frame of the same GOP, and thus requires less transmission time than an I-Frame.

Figure 8:
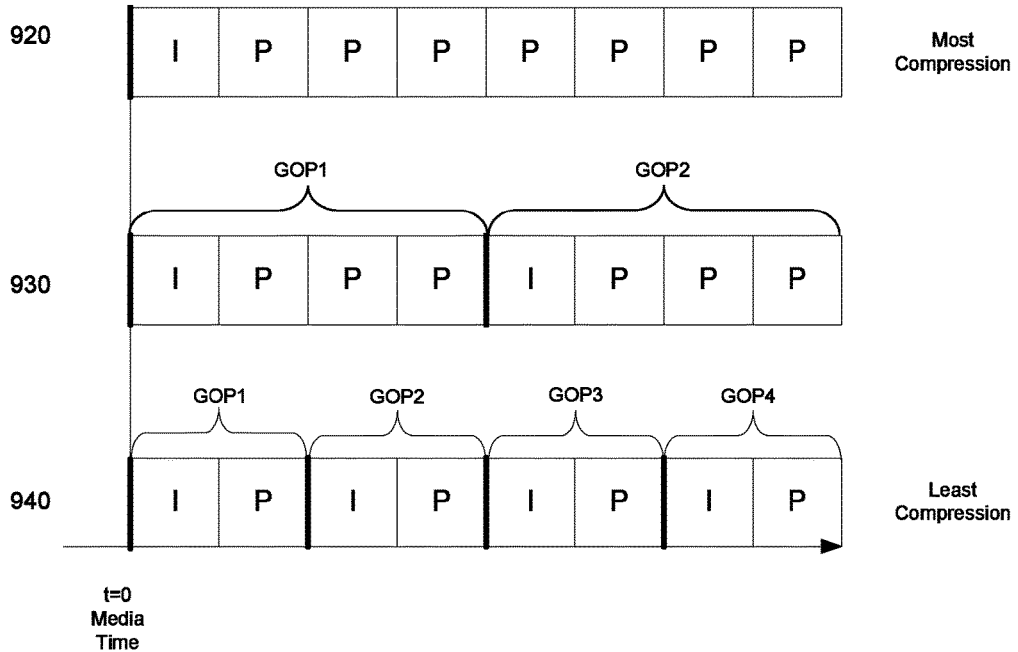
FIG. 8 illustrates example encoding schemes for encoding the display frames for wireless transmission in accordance with example embodiments of the present disclosure.

Examples of various GOP structures 920, 930, and 940 are represented in FIG. 8. GOP structures 920 and 930 GOP represent the same length of video (in time) as each other. However, each structure has a different number of frames of each type. Structure 920 represents one GOP having one I-Frame and seven P-Frames. Structure 930 represents two GOPs each having one I-Frame and three P-Frames. Since the I-Frames typically offer less compression than the P-Frames, the GOP structure 930 may offer less compression than that of GOP structure 920. GOP structure 930 requires two I-Frames and six P-Frames to represent the same length of video as GOP structure 920, which instead requires one I-Frame and seven P-Frames.

Structure 940 represents four GOPs having one I-Frame and one P-Frame each. However, four GOPs are needed to represent the same length of video as that of GOP structures 920 and 930. Accordingly, the GOP structure 940 offers the least compression of all the representations shown.

Each GOP may be characterized by a GOP size, i.e., the number of frames in the GOP, and by a GOP structure, i.e., the number of each type of frame in the GOP, and the arrangement thereof. Increasing the GOP size increases the compression of the stream of display frames, reducing the time and bandwidth needed to transmit and process the stream of display frames because the time-period between two successive key-frames (i.e., I-Frames) is increased. Thus, less key-frames are used. Adjusting the GOP structure may affect the compression of the stream of display frames, as described previously, thus affecting the time and bandwidth needed to transmit and process the stream of display frames. Accordingly, the throughput of the stream of display frames outputted by the encoder 504 may be directly correlated with both the GOP size and GOP structure, amongst other factors.

Figure 7:
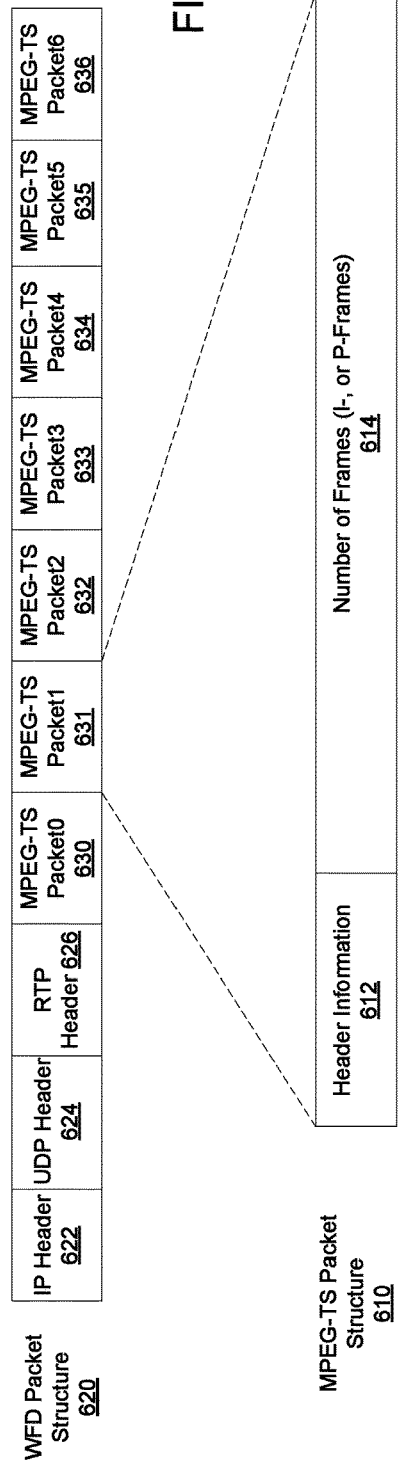
FIG. 7 illustrates an example packet structure for encapsulating display frames for wireless transmission in accordance with example embodiments of the present disclosure.

The encoder 504 may encapsulate one or more frames into packets formatted according to an MPEG-transport stream (MPEG-TS) format. An example structure of an MPEG-TS formatted packet 610 is shown in FIG. 7. Each MPEG-TS packet includes header information 612 and a number of Frames (I-, or P-Frames) 614. The header information 612 provides additional data relating to the Frames 614, such as data for synchronization and for maintaining transmission integrity when the transmission signal is degraded. The MPEG-TS packet may be of a fixed data size, such as 188 Bytes. Accordingly, the number of Frames encapsulated therein may depend on the type of frames encapsulated and their corresponding data sizes.

The encoder 504 may output, to the source buffer 506, a series of MPEG-TS packets similar to the MPEG-TS formatted packet 610. The source buffer 506 may be implemented as a First In, First Out (FIFO) structure stored in the RAM 308 of the wireless device 130. The source buffer 506 may be allocated only a limited space in the RAM 308, sufficient to only store a pre-determined number of GOPs or Frames. The memory space allocated to the source buffer 506 may be based on limitations associated with the sink buffer 516 or other limitations.

The wireless device 130 may also send display frames encoded using GPU drawing commands if the display device 120a supports the graphical API used by the wireless device 130. This may be determined by exchanging a list of supported graphical APIs at the device capability negotiation phase of FIG. 4, which may include, without limitation, any of DirectX® and OpenGL®). Additional information, such as the size of the sink buffer 518 (FIG. 6) available for receiving GPU drawing commands, and the number of operations per second the GPU 231 of the display device 120a is capable of can be used by the wireless device 130 to ensure that no buffer overrun events occur.

When a display frame is encoded using GPU drawing commands, the processor 302 sends GPU drawing commands 503 to the source buffer 506. The processor 302 bypasses the encoder, as the encoding of the GPU drawing commands 503 do not usually need to be changed for wireless transmission. Additional information needed by the GPU 231 to complete processing of the GPU drawing commands 503 may also be placed on the source buffer 506. The GPU 231 may require data objects upon which to execute the GPU drawing commands 503 associated with the display frame. In some embodiments, the WLAN transceiver 508 of the wireless device 130, operating under control of the processor 302, sends one or more data objects associated with the display frame to the WLAN transceiver 518. In one example, a GPU drawing command to draw a graphic is sent to the GPU 231. Accordingly, the graphic file representing the graphic is also sent to the GPU 231. However, if at a later time, a GPU drawing command to resize the graphic is sent to the GPU 231, the same graphic file need does not need to be sent again. In some embodiments, the data objects are sent to the encoder 504 for encoding and/or compression to reduce the data size of the data objects prior to the wireless transmission.

The data objects are encoded by the encoder 504 based on the encoding scheme or schemes supported by both the encoder 504 of the wireless device 130 and the decoder 514 of display device 120a, as determined in the device capability negotiation phase in FIG. 4. For image files, this may include any one of, without limitation, JPEG, GIF, TIFF and PNG encoding. For video, this may include, without limitation, H.264 and MPEG2 encoding. In some embodiments, the transfer of the data objects is enabled by the use of the Digital Living Network Alliance (DLNA®) standard, which helps ensure interoperability between devices. When the encoded data objects are received at the display device 120a, they may be decoded by the decoder 514.

The wireless device 130 may also send more or more display frames such that each display frame is encoded using GPU processing and media streaming using a video encoding scheme such as DLNA. Both the wireless device 130 and the display device 120a should support screencasting, GPU processing and GPU processing and media streaming. The information regarding supported encoding schemes is exchanged during the device capability negotiation phase of FIG. 4. Specific limitations pertaining to the use of GPU processing and media streaming may also be exchanged, including, without limitation, any limitations specific to the number of portions each display frame may be split into, or the number of times per unit time the encoding scheme may be switched for a particular area. Any other limitation due to hardware or software on either the wireless device 130 or the display device 120 is also exchanged.

When a display frame is encoded using both a video encoding scheme and GPU drawing commands, the processor 302 sends GPU drawing commands 503 to the source buffer 506 and sends pixel information 502 to the encoder 504 for compression and/or encoding (as previously described). The GPU drawing commands 503 represent the portion or portions of the display frame that are encoded using GPU drawing commands, and the pixel information 502 represent the portion or portions of the display frame that are encoded using the video encoding scheme. The processor 302 may also send to the source buffer 506 relative position and size information to identify the position and size of each portion in the display frame, to allow the display device 120a to recreate the correct display frame.

The processor 302 of the wireless device 300, in some embodiments, provides a user interface to allow the user to rearrange the position of each of the portions of the display frame when displaying the display frame at the display device 120a. Additionally, some portions may not be displayed on the display device 120a, and some portions may be scaled in size differently at the display device 120a. That is, the content display on the wireless device 300 and display device 120a may differ somewhat in size, aspect ratio or arrangement, for example, to accommodate differ screen shapes and sizes. In response to user input received via the user interface, the processor 302 controls the GPU 331 and/or the video encoder 504 to generate an altered display frame for display at the display device 120a.

The source buffer 506 outputs the display frames stored therein to the WLAN transceiver 508 (which includes transmitter and receiver capability) for further processing and transmission. The WLAN transceiver 508 may encapsulate several MPEG-TS packets into one Wi-Fi Direct (WFD) packet and may send a number of WFD packets in a real-time stream. An example structure of a WFD packet 620 is shown in FIG. 7. Other WFD packet structures are also possible. In the shown example, the WFD packet 620 includes: (1) an IP header 622, for example providing the IP address of the display device 120a; (2) a UDP header 624, for example identifying the audio or video stream; (3) an RTP header 626 providing time-stamp information to synchronize media playback, sequence number information to indicate the position in WFD packet in relation to other WFD packets, and other information; and (4) payload information, for example, a number of MPEG-TS packets 630-636, as previously described. The WFD packet 620 may have a fixed data size, such as 1356 Bytes. The header information 622, 624, 626 may occupy only 40 Bytes. Accordingly, 1316 Bytes are allocated for pay-load information. Accordingly, one WFD packet 620 may include up to 7 MPEG-TS packets, as described in the example packet structures 610 and 620.

In the example shown in FIG. 7, WFD packet 620 utilizes a user datagram protocol (UDP) for transmission. The UDP transmission protocol provides minimal transmission overhead, but does not offer reliability in transmission, as no acknowledgement of receipt (ACK) of the packet is sent from the display device 120a. The wireless device 130 thus does not know if a packet is lost in transmission. This is acceptable when the display frames are encoded using the video encoding scheme, as any display frames in the lost packets are simply ignored. However, when the display frames include any GPU drawing commands, reliable transmission is more important. The display device 120a may not be able to reproduce the correct images for one display frame if the GPU drawing commands for the preceding display frame are not received. This is illustrated by the following example. If a first command is sent to draw a circle is not received, a subsequent command to resize the circle would not be possible to complete. Accordingly, a transmission protocol which includes acknowledgement of receipt may be preferred when GPU drawing commands are encapsulated in the WDP packet. Once such protocol is the transmission control protocol (TCP).

Figure 9:
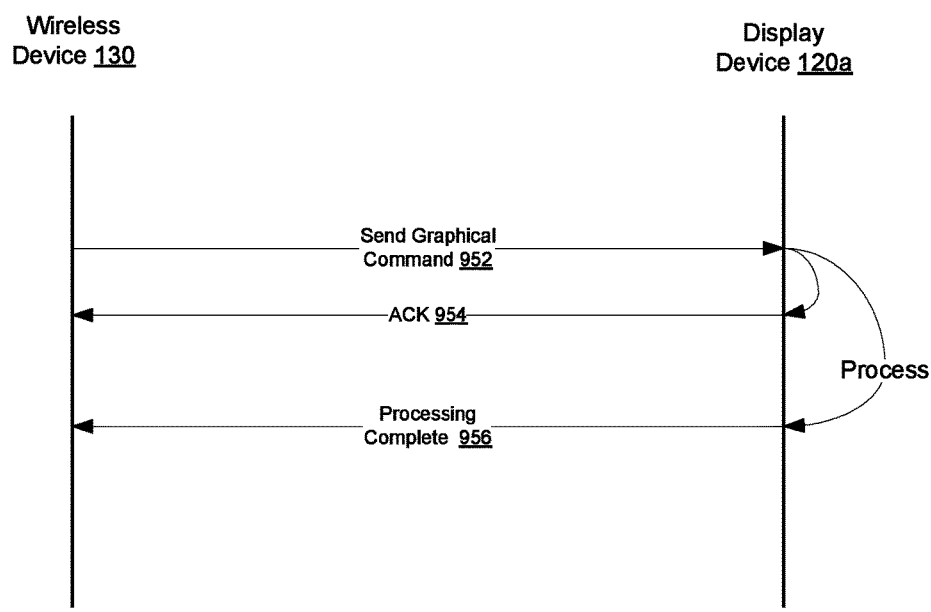
FIG. 9 illustrates a flow-diagram of communication between the wireless communication device of FIG. 3 and the display device of FIG. 2 to confirm receipt of a display frame.

An example protocol providing acknowledgement of receipt (ACK) of a packet is shown in FIG. 9. Such a protocol is particularly useful when a display frame is encoded completely or partially using GPU drawing commands, as previously described. At 952 the wireless device 130 sends one or more GPU drawing commands encapsulated in a packet, similar to the WFD packet 620. A string may be provided in the header of the packet indicating to the WLAN transceiver 518 that the packet contains GPU drawing commands. Upon receiving the packet and determining that the packet contains GPU drawing commands, the display device 120a sends an ACK to the wireless device 130 at 954. An ACK may be sent in response to receipt of the entire packet, or receipt of a single GPU drawing command, or receipt of a set of GPU drawing commands and/or video frames corresponding to a single display frame, depending on the protocol used. The ACK also provides an indication to the wireless device 130 of the time the packet, or the single GPU drawing command, or set of the GPU drawing commands and/or video frames corresponding to a single display frame is/are received at the display device 120a. By using a synchronized clock between the display device 120a and the wireless device 130 to indicate the time of receipt, the wireless device 130 is able to determine the latency in transmitting a display frame from the wireless device 130 to the display device 120a.

Upon receipt of the packet from the wireless device 130, the display device 120a also starts processing of the GPU drawing command(s), using GPU 231. Additionally and optionally, once processing is complete, an indication of this is sent to the wireless device 130 at 956. Such a "processing complete" message may optionally include an indication of either the time used by the GPU 231 to complete processing of each GPU drawing command, or an indication of the time used by the GPU 231 to complete processing of all the GPU drawing commands in the packet, or an indication of the time used by the GPU 231 to complete processing and/or decoding of the set of GPU drawing commands and/or video frames corresponding to a display frame. The display device 120a may compute and send the time information to the wireless device 130, or alternatively, the display device 120a may send timestamp information to the wireless device 130, thereby allowing the wireless device 130 to compute the time. This time is indicative of the latency in processing the GPU drawing commands at the display device 120a.

The WLAN transceiver 508 may transmit each WFD packet 620 as soon as the packet is ready for transmission, to be received at the WLAN transceiver 518 of the display device 120a. The WLAN transceiver 518 may then extract the encapsulated MPEG-TS packets and send them to the sink buffer 516 to await processing by the decoder 514 (for pixel information) or the GPU 231 (for GPU drawing commands). The display device 120a then displays on the display screen 212 the decoded display frame.

Wireless Transmission of Real-Time Media

Figure 10:
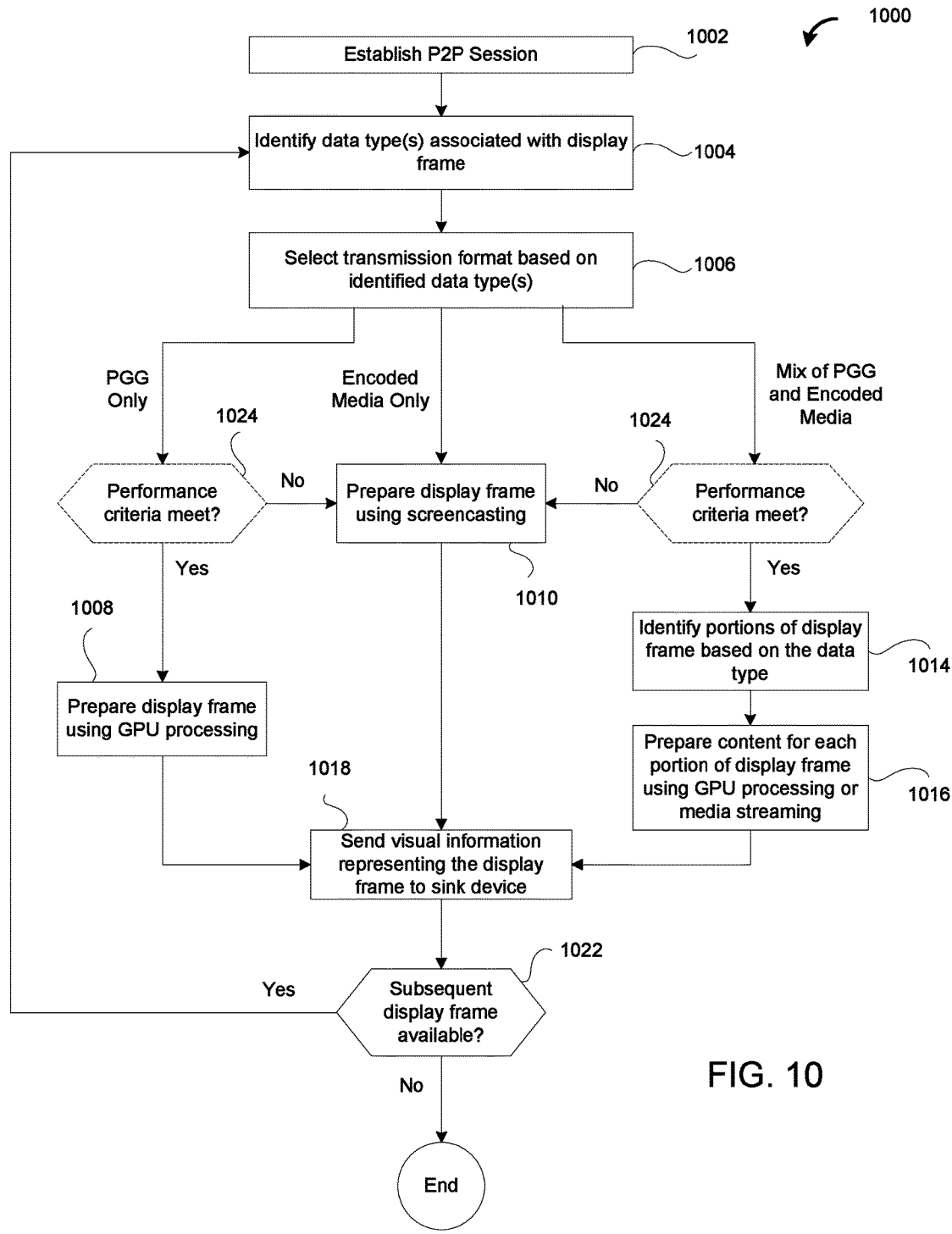
FIG. 10 illustrates a flowchart of a method for wirelessly transmitting content from a source device to a sink device in accordance with example embodiments of the present disclosure.

Reference is now made to FIG. 10 which illustrates a flowchart of a method 1000 for wirelessly transmitting content from a source device, such as the wireless device 130, to a sink device, such as the display device 120a, over a wireless transmission channel. The method 1000 may be implemented by the wireless device 130 or other source device. The method 1000 may be carried out by software executed, for example, by a processor. Coding of software for carrying out such a method 1000 is within the scope of a person of ordinary skill in the art provided the present disclosure. The method 1000 may contain additional or fewer processes than shown and/or described, and may be performed in a different order. Computer-readable code executable by the processor 302 to perform the method 1000 may be stored in a computer-readable medium such as a memory of a host device.

To provide display mirroring, the source device may send the sink device screencast encoded data when the displayed content includes an image or video, or device may send the sink device GPU encoded data when the displayed content is programmatically generated graphics. While arbitrating between screencast encoding and GPU encoding schemes may be adequate in cases of pure video and pure graphics transmission, this approach has limits. Firstly, modern user interfaces are typically not limited to one type of content and often display a blend of programmatically generated graphics and images and/or video. Secondly, the wireless transmission channel capacity for transfer between the source device and sink device can differ over time and should be regularly monitored for best performance. This has an impact on the optimal type of encoding scheme. Lastly, the hardware of the sink device is often integrated into the infrastructure, e.g. embedded into TVs or monitors or available as an HDMI stick, and remains there for a longer time. At the same time, source devices (e.g., smartphones) are rapidly evolving and the hardware capabilities of the source device can exceed the hardware capabilities of the sink device in many cases. This has a further impact on the optimal type of encoding scheme.

FIG. 10 presents a method 1000 for wirelessly transmitting content, e.g. in the form of display frames, from a source device to a sink device in which content may be sent in a screencast scheme format (e.g., Miracast™), GPU encoding format (e.g., OpenGL® or DirectX®), or a combination of GPU encoding with media streaming.

When a screencast format such as Miracast™ is used, the source device performs a local overlay of graphics, image and video information, generates an encoded (and typically also compressed) version of the content of its display memory buffer which is output as video (the Miracast™ format is a variant of H.264), and sent to the sink device. The sink device decodes and displays the video, thereby providing an emulated version of the display the buffer content of the source device on the display of the sink device. When the display content on the source device includes encoded media objects, the encoded media objects are transcoded (decoding and subsequent encoding) by the source device, for example in accordance with Miracast™ to create an encoded media object in, and display frames in the transcoded format are sent to the sink device. Screencast typically provides the highest quality when image and/or video needs to be transmitted, but may be limited by the available wireless transmission channel capacity (transmission data rate). Screencast may be advantageous if the hardware of the sink device does not support efficient rendering of complex graphics or the data rate of the wireless transmission channel is lower than the rate for the multiplexed stream.

When GPU encoding is used, all visual information displayed on the source device is transmitted to the sink device as compressed graphics. Graphics resources such as pixel maps and textures are indexed so that the graphics resources can be cached in memory on the sink device. A set of GPU drawing commands are used to modify the graphics resources cached on the sink device. The necessary graphics resources and GPU drawing commands are obtained from a GPU on the source device, and sent to the sink device. GPU encoding is typically the highest quality path for programmatically generated graphics; however, GPU encoding does not work when portions of the display content on the source device include encoded media such as image or video information (i.e., "natural" or native video rather than only "simulated" video). GPU encoding offloads the processing burden to render the display content to the GPU 231 of the sink device. When the visual content is limited to programmatically generated graphics, GPU encoding may be advantageous because it is very bandwidth efficient and exhibits very low latency since only the GPU drawing commands get transmitted over the wireless transmission channel once the graphics resources are cached on the sink device. However, the hardware of the sink device could be overloaded if the programmatically generated graphics complexity is too high, resulting in longer processing time for the graphics rendering and lower frame rates. Additionally, with increased graphics performance of the source device, local rendering on the source device may be superior in quality to remote rendering on the sink device due to the remote GPU 231 on the sink device having less performance, in which case screencast may be advantageous.

When a combination of GPU encoding with media streaming is used, a multiplexed stream of programmatically generated graphics and image/video information is sent to the sink device. The streams are kept separate and are overlayed by the sink device. The separation of the streams seeks to provide the highest overall quality. The image/video information may comprise encoded media objects which are available to the sink device in encoded format (e.g., JPEG image file, an H.264 or MPEG2/MPEG4 video file). In such cases, display frames for the encoded media objects may be transferred from the source device to the sink device without transcoding using media streaming, for example in accordance with DLNA®/UPnP.

The method 1000 assumes that the source device, such as the wireless device 130, and the sink device, such as the display device 120a, are both enabled for screencast, GPU encoding/decoding, and GPU encoding/decoding with media streaming. In other embodiments, as a preliminary step, the processor 302 of the wireless device 130 determines the technical capabilities of the sink device for receiving, displaying, and decoding display frames. The technical capabilities may include the codecs (encoding and decoding schemes) supported, GPU support, etc. With reference to step 408 of FIG. 4, this information is usually exchanged during the device capability negotiation phase. If the sink devices does not have decoders for encoded media objects in the display frames or does not support GPU, encoding of the frames is performed using Miracast™ or other screencast encoding scheme in which the screen content of the source device is encoded as video and sent to the sink device. If the sink device does not support Miracast™ or other screencast encoding scheme, the method 1000 ends.

At 1002, a P2P session is established between the source device, the wireless device 130, and the sink device, the display device 120a. This may be performed in accordance with the steps outlined in FIG. 4, as previously described.

At 1004, the processor 302 of the wireless device 130 identifies one or more data types in or associated with the content being displayed on the display of the wireless device 130 to be transmitted from the source device to the sink device. The content is typically examined on the basis of each display frame. The data types describe the visual information displayed by the wireless device 130. In some embodiments, the data types are programmatically generated graphics and encoded media. Different data types may be used in other embodiments. In some embodiments, the encoded media may include, but is not limited to, digital still image(s) and digital video and audio. Other encoded media may be included in other embodiments, for example, the encoded media may also include audio. In other embodiments, the data types may be a list of encoded media object formats (e.g., images, video and audio). The list of encoded media object formats may be those supported (i.e., having the necessary codecs) by the source device and sink device.

The data types may be identified using one or more of a variety of approaches including the active application(s) on the source device, i.e. wireless device 130, during the P2P session. For example, applications on the wireless device 130 may have preset associations with one or more data types For example, a video playback application may be associated with encoded media (i.e., video) whereas a video game may be associated with programmatically generated graphics.

At 1006, a transmission format for transmitting the display content of the wireless device 130 is selected. The transmission format is selected based on the identified data type(s) of the display frame, such as programmatically generated graphics (PGG), encoded media, or a combination thereof. The transmission format is selected from screencasting (e.g., Miracast™), GPU encoding (e.g., OpenGL®) or DirectX®), or a combination of GPU encoding with media streaming. It is believe that each transmission format may provide a relatively higher efficiency when used in association with particular data types, as described previously. The processor 302 of the wireless device 130 controls the encoding of display frames on the basis of the data type(s) associated with the display frames to ensure capability and efficiency. The efficiency in association with a particular data type may be defined by the amount of compression achieved (i.e., lower bandwidth), faster transmission rates, lower processing times, or by other means. As previously described, GPU encoding provides relative high efficiency when the data type associated with the display frame is programmatically generated graphics. On the other hand, screencasting provides relative high efficiency when the data type associated with the display frame is encoded media such as video or images.

At 1008, the content of the display frame is prepared using GPU encoding when the display frame includes only programmatically generated graphics. The display frame is already encoded using the GPU 331 of the wireless device 130. The graphics resources and a set of one or more GPU drawing commands representing the display frame can be sent to by the processor 302 on an as-is basis, or may be modified for the display device 120a and (re)encoded before sending. For example, the display frame may be modified for the technical capabilities of the display device 120a. Example steps for encoding and preparing the display frame for transmission are described with reference to FIG. 6.

At 1010, the content of the display frame is prepared using screencasting when the display frame includes only encoded media, such as video. The preparing comprises encoding the display frame as video, for example, in the Miracast™ format.

When more than one data type is associated with the display frame, i.e. when the display frame includes programmatically generated graphics and encoded media, GPU processing plus media streaming (e.g., DLNA media streaming) is used to provide the display content of the source device to the sink device. The source device uses graphics or GPU processing for sending the programmatically generated graphics (e.g., via OpenGL) and uses DLNA or similar techniques for sending encoded media objects (e.g., audio, images, videos). GPU processing uses graphics resources and GPU display comments to send programmatically generated graphics, similar to how programmatically generated graphics are displayed by the GPU 331 on the source device. DLNA media transfer/streaming works by sending the encoded media object (already encoded in one of a number of source codecs). The encoded media objects are sent separately from the GPU display commands and graphics resources (if any need to be sent). The sink device, which has the necessary codecs, decodes and reproduces the encoded media objects. This can be contrasted to screencasting using Miracast™ where one codec (a variant of the H.264 codec) has been standardized for both source device and sink device.

At 1014, the processor 302 identifies the portions of the display frame associated with each data type. More than one data type may be associated with the display frame in many examples, such as when the display frame is representative of a video being played in a browser window.

The identification in 1014 is performed at the application layer in some embodiments. Each running application outputs an application window for display at the display screen 312, the display screen 212, or both. Each application window is characterized by a boundary, which may be characterized by horizontal and vertical pixel values in a two-dimensional space representing the display frame. The application window may in its entirety define a portion of the display frame. However, in some embodiments, each application is split into multiple portions, such as in the browser window example previously described. The video displayed within the boundary of the browser window is in itself identified as a different portion than the region of the browser window displaying the video. Thus, one portion is identified as the rectangular area of the browser window excluding the rectangular region of the video.

In more complex scenarios, more than two different portions may be identified. In one example, a display frame represents multiple application windows displayed side-byside in addition to user-interface elements generated by the operating system 378. For example, a browser window in which a video is being played, a photo application window having user interface elements and in which an image is being displayed, are displayed side-by-side. The region of the video and the region of the photo within the respective application windows may be associated with encoded media, such as images and video. However, the remaining region of the browser window and the user interface elements of the photo application and the user interface elements of the operating system may be associated with programmatically generated graphics. Thus, several regions are identified and each region is associated with a particular data type.

At 1016, the processor 302 prepares the content of each portion of the display frame based on the data type associated therewith, namely programmatically generated graphics is prepared using GPU encoding as described above in connection with 1008, and encoded media is prepared using media streaming such as DLNA® streaming. That is, similar to 1008 and 1010, the portions of the display frame which includes programmatically generated graphics are prepared using GPU encoding while the portions of the display frame which includes encoded media are prepared using media streaming such as DLNA® streaming.

Example steps for encoding and preparing the display frame for transmission are described with reference to FIG. 6. The processor 302 also determines the relative position of the portions relative to one another. This position information may be included in the data packet in which the encoded display frame is sent from the source device to the sink device to allow the sink device to recompile the different portions in the correct location relative to each other. The position information may be characterized, for example, by horizontal and vertical pixel values in a two-dimensional space representing the display frame.

The processor 302 then controls the WLAN transceiver 508 of the wireless device 130 to encapsulate the display frame into a packet for sending to the WLAN transceiver 518 of the display device 120*a* as previously described. At 1018, the processor 302 sends visual information representing the display frame in the transmission selected transmission format to the sink device. That is, the prepared content is sent to the sink device, i.e. the display device 120*a*. In at least some embodiments, a packet encapsulating the display frame is then sent to the display device 120*a*. As previously described with reference to FIG. 9, upon receiving the packet, the display device 120*a* may send an ACK 954 to the wireless device 130, and may additionally send a message indicating that processing of the display frame is complete. The message comprises information which includes an indication of the transmission latency and the processing latency at the display device 120*a*, which is indicative of the overall performance of the system, and is useful in adapting the encoding scheme at the wireless device 130 for encoding and sending subsequent display frames to the display device 120*a*. Typically, a stream of display frames is sent to the display device 120*a*, such that an average of 15 to 30 display frames are displayed each second, until the wireless device 130 stops transmitting display frames.

At 1022, the processor 302 determines if a subsequent display frame is available. When no subsequent display frame is available, the method 1000 ends, and in at least some embodiments, the P2P session established at 1002 is also ended.

When a subsequent display frame is available, processing returns to 1004 in which the processor 302 of the wireless device 130 determines one or more data types in or associated with the content being displayed on the display of the wireless device 130 to be transmitted from the source device to the sink device. The transmission format is then selected at 1006 as above. However, when the display content is (i) programmatically generated graphics or (ii) a mix of programmatically generated graphics and encoded media, the processor 302 may at 1024 optionally evaluate the performance of the wireless transmission using predetermined performance criteria. In other embodiments, the operations at 1024 may be omitted.

The predetermined performance criteria are evaluated when performance data is available, for example, after one or a number of display frames have been prepared and transmitted to the sink device, i.e. display device 120*a*. In some embodiments, the evaluation may be performed before each subsequent display frame is processed. In other embodiments, the evaluation may be performed at regular intervals such as, for example, the processing of a predetermined number of display frames since the last evaluation (e.g., every 10, 25 or 100 frames) or a predetermined duration since the last evaluation (e.g., every 1, 2 or 5 seconds).

Alternatively, the predetermined performance criteria may be evaluated based on historical performance data and therefore could be performed at any time. The historical performance data may be based on the data type(s), active application(s) during the P2P session, the particular source device or particular type of source device, the particular sink device or particular type of sink device, or any combination thereof.

The predetermined performance criteria may be user or application defined, or possibly a combination thereof, and may vary between embodiments. In some embodiments, the predetermined performance criteria include latency for data transfer and presentation on the remote screen, and quality of image/video reproduction. The time information received (as shown in FIG. 9) from the display device 120*a* in response to receiving the display frame is useful in evaluating latency.

When the wireless transmission performance meets predetermined performance criteria, operations proceed to 1008 or 1014 as described above. When the wireless transmission performance does not meet predetermined performance criteria, operations proceed to 1010 in which screencasting is used and optionally the transmission of subsequent display frames is adapted.

When a stream of display frames is sent, each display frame received at the display device 120*a* should be processed and displayed at the display device 120*a* at a given deadline to ensure continuity of the stream. Otherwise, the display frame may be skipped (i.e., "dropped"). Dropped frames create a sluggish or choppy reproduction.

A first measure of latency is whether the processing time for graphics rendering on the sink device, i.e. display device 120*a*, ($T_{processing}$) is greater than the time interval between consecutive display frames ($T_{frame}$). The processor 302 determines whether the processing time for graphics rendering on the sink device is greater than the time interval between consecutive display frames. When $T_{processing}$ is greater than $T_{frame}$, the wireless device 130 determines that the display device 120*a* is unable to process the display frames in real-time or near real-time. This suggests that the hardware of the sink device may not be sufficient.

When the first measure of latency is not satisfied and processing other than screencasting is in use (e.g., GPU processing or GPU/DLNA processing and media streaming), the processor 302 of the wireless device 130 changes the processing to screencasting. Though not shown, in addition to changing the processing to screencasting, for example when changing the processing to screencasting does not cause the first measure of latency to be satisfied, the processor 302 of the wireless device 130 may reduce the frame rate of the screencasting. This could be an interactive process in that the frame rate may be reduced until $T_{processing}$ is equal to or less than $T_{frame}$. The screencasting may be adapted by varying the compression setting to achieve the desired number of frames per second by increasing the compression and reducing the quality.

When the first measure of latency is not satisfied and screencasting is in use, the processor 302 of the wireless device 130 may reduce the frame rate of the screencasting (not shown). This could be an interactive process in that the frame rate may be reduced until $T_{processing}$ is equal to or less than $T_{frame}$.

A second measure of latency is the overall latency associated with display of the display frame at the display device 120a. The processor 302 determines whether the overall latency is greater than maximum allowed latency value for the current use case. The overall latency, in at least some embodiments, is the sum of the processing time for graphics rendering on the sink device ($T_{processing}$) and the time for sending the complete data of one frame ($T_{transmission}$). $T_{latency,max}$ is the maximum allowed latency between source and sink signal.

When the second measure of latency is not satisfied and processing other than screencasting is in use the processor 302 of the wireless device 100 changes the processing to screencasting. Though not shown, in addition to changing the processing to screencasting, for example when changing the processing to screencasting does not cause the first measure of latency to be satisfied, the processor 302 of the wireless device 130 may reduce the frame rate of the screencasting. This could be an interactive process in that the frame rate may be reduced until ($T_{transmission}+T_{processing}$) is less than or equal to $T_{latency,max}$.

When the second measure of latency is not satisfied and screencasting is in use, the processor 302 of the wireless device 130 may reduce the frame rate of the screencasting (not shown). This could be an interactive process in that the frame rate may be reduced until ($T_{transmission}+T_{processing}$) is less than or equal to $T_{latency,max}$.

The maximum allowed overall latency may differ between applications and/or data type in dependence on the use case. In specific use cases when latency has a high impact on overall performance, the maximum allowed latency is set to a relatively low value. For example, low latency is particularly desired when a user is running a video game application on the wireless device 130 and using the screen 212 of the display device 120a. A low latency helps ensure a minimum delay from initiating a game control and seeing the effect of the game control on the screen 212. In such a use case, the maximum allowed latency may be set to 50 milliseconds (ms). In another use case, a user is typing a document using a word processing application running of the wireless device 130 and using the screen 212 of the display device 120a. A delay between hitting a key on the keyboard and viewing the associated character on the screen is undesirable. However, a higher latency may be considered acceptable than in the video game use case. In such a use case, the maximum allowed latency may be set to 100 ms. In another use case, a user is playing a video on the wireless device 130 and using the screen 212 of the display device 120a. A high latency is typically acceptable. In such a use case, the maximum allowed latency may be set to 250 ms.

While specific values have been described above for the maximum allowed latency for particular use cases, it is understood that such values are only exemplary. Additionally, it is understood that the maximum allowed latency will vary greatly in dependence on the system being used. For example, for a high end system, the maximum allowed latency values may be lowered, whereas for a low end system, the maximum allowed latency values may be increased.

As noted above, quality of image/video reproduction may be one of the predetermined performance criteria. The processor 302 may also, in some embodiments, monitor the quality associated with the encoded display frame at the wireless device 130 and/or the display device 120a. The quality of the encoded display frame at the wireless device 130 can be characterized relative to the original display frame (for example, in some embodiments, the original display frame is the pixel information in the frame buffer 424).

The processing associated with processing the display frame as described in method 1000 may result in a compressed display frame. The effect of the processing is to reduce the data size of the display frame, which may result in a loss of relevant information. The signal quality can be characterized by the processor 302 using several techniques. In one embodiment, the processor 302 determines a peak-signal-to-noise ratio (PSNR) associated with the processed display frame relative to the original display frame. This, in effect, compares the ideal sequence of high-resolution images on the source device with the reproduced images on the sink device. In another embodiment, the processor 302 determines the spatial frequency of both the original display frame and processed display frame. A loss in the spatial frequency indicates a reduction is the image quality. In another embodiment, the presence of block artifacts in the processed image compared to the original image is detected by the processor 302, which may include artificial edges, color and brightness changes.

Using similar techniques, the processor 202 at the display device 120a can characterize the quality of the processed display frame at the display device 120a relative to the original display frame or the processed display frame at the wireless device 130. The wireless device 130 and display device 120a exchange relevant information to enable the comparison of the display quality frame quality characteristics. For example, the wireless device 130 may send a value corresponding to the spatial frequency of the original display frame and processed display frame at the wireless device 130. After decoding the display frame at the display device 120a, the processor 202 can also compare the spatial frequency of the processed display frame at the display device 120a to both the original and the processed display frames at the wireless device 130. The display device 120a may also send a value corresponding to the spatial frequency of the decoded display frame at the display device 120a to the wireless device for comparison by the processor 302. An additional measure of quality may also be determined by the processors 202 and 302 when a stream of display frames is considered—the rate at which display frames are processed and displayed on the respective display frames.

In some embodiments, when a relative loss of quality between the display frame as decoded on the display device 120a and the original display frame is determined to exist, the processor 302 examines the relative loss of quality to determine whether it is an acceptable level of loss. For each use case, as previously described, a different amount of loss of quality is permitted by defining a threshold level of accepted loss of quality.

If the loss of quality is below the predefined threshold, the processor 302 attempts to configure the processing of future display frames to mitigate the loss of quality. In one embodiment, when processing other than screencasting is in use, the processor 302 of the wireless device 130 changes the processing to screencasting. Though not shown, in addition to changing the processing to screencasting, for example when changing the processing to screencasting does not cause the first measure of latency to be satisfied, the processor 302 of the wireless device 130 may reduce the frame rate of the screencasting. This could be an interactive process in that the frame rate may be reduced until the loss of quality is equal to or above the predefined threshold. The video encoding scheme may be adapted by varying the compression setting to achieve the desired number of frames per second by increasing the compression and reducing the quality.

When the loss of quality is below the predefined threshold and screencasting in use, the processor 302 of the wireless device 130 may reduce the frame rate of the screencasting (not shown). This could be an interactive process in that the frame rate may be reduced until the loss of quality is equal to or above the predefined threshold.

Alternatively, in other embodiments, the processing method may be selected using a cost function which assesses the power consumption of each processing scheme under the constraints that the above-noted latency and quality performance criteria are met, namely equality is above the minimum acceptable quality, the latency is below the overall (use case dependent) maximum latency limit, and the processing time is below the limit defined by the frame rate. The processing option which provides the minimum value for the cost function, i.e. the most power-efficient processing scheme, is selected. If all of the constraints are not fulfilled, the display frames are processed using method 1000 described. This embodiment assumes that the highest visual quality could be achieved even with lower performance hardware on the sink device if there is enough time. This embodiment may increase latency and so may be not be preferred when the programmatically generated graphics content is too complex. We also think that we have to take link usage (data rate) and power consumption into consideration since we want long operation time and also operation in congested channels (with low data rate).

Power consumption is a useful consideration since the source device, i.e. wireless device 130, is typically battery powered and may enter a low power mode when the remaining battery life falls below a predefined threshold, among other reasons. Rather than determining a power consumption of each processing scheme in real-time or near real-time, each of the processing schemes may have a power consumption rating based on power consumption history data stored in memory 320 from processing similar display frames. Display frames may be considered to be similar if the same processing type and characteristics are used. For example, in the case of screencasting, the selected GOP structure and the selected profile may be used to compare the similarity of two display frames. In the case of the GPU processing, the number of graphics resources and the number of GPU commands to represent a display frame may be considered along with the power consumption rating since some GPU drawing commands may require more processing power to complete. Similar considerations can also be made when the display frame is processing using GPU/DLNA processing.

Thus, described in the present disclosure are methods and devices for wirelessly transmitting content from a source device to a sink device, such as a real-time stream of display frames. Each display frame is processing using screencasting, GPU processing or GPU/DLNA processing based on the data type(s) associated with the display frame. Additionally, latency, image/video quality and/or power consumption associated with the wireless transmission may be used to adapt the processing of the display frames.

The above-described embodiments of the present disclosure are intended to be examples only. Those of skill in the art may affect alterations, modifications, and variations to the particular embodiments without departing from the scope of the application. Although the description relates to specific examples for illustration, where the WLAN is an IEEE 802.11-based network, for example, different environments may be applicable as well. As a few other examples, the wireless networking may be based on a WiMAX network (i.e., IEEE 802.16), or an UWB network (i.e., IEEE 802.15). The teachings of the present disclosure are intended to cover and embrace all suitable changes in technology.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method for wirelessly transmitting content from a source device to a sink device, the source device comprising a processor, a graphics processing unit (GPU) coupled to the processor, and a wireless communication subsystem coupled to the processor, the method comprising:
   preparing, by the processor and/or GPU of the source device, a first set of display frames for the sink device from a set of source display frames in accordance with a selected transmission format, wherein the selected transmission format is one of screencasting, graphics processing unit (GPU) processing or GPU processing with media streaming;

wirelessly transmitting, by the wireless communication subsystem of the source device, the first set of display frames to the sink device;

determining, by the processor of the source device, whether predetermined performance criteria have been met; and when the predetermined performance criteria have not been met and the selected transmission format is GPU processing or GPU processing with media streaming, changing the selected transmission format from GPU processing or GPU processing with media streaming to screencasting.

2. The method of claim 1, further comprising:
when the predetermined performance criteria have not been met and the selected transmission format is GPU processing or GPU processing with media streaming, preparing, by the processor and/or GPU of the source device, a second set of display frames for the sink device from a further set of source display frames in accordance with a screencast encoding format, and wirelessly transmitting, by the wireless communication subsystem of the source device, the second set of display frames to the sink device.

3. The method of claim 1, further comprising:
when the predetermined performance criteria have not been met and the selected transmission format is screencasting, reducing a frame rate of the screencasting.

4. The method of claim 3, wherein the frame rate of the screencasting is reduced until the predetermined performance criteria are met.

5. The method of claim 1, wherein the predetermined performance criteria comprise a transmission latency associated with sending the first set of display frames to the sink device, a processing latency associated with processing the first set of display frames on the sink device, a loss of quality, or any combination thereof.

6. The method of claim 1, wherein the set of source display frames includes one or more data types selected from programmatically generated graphics and encoded media.

7. The method of claim 1, wherein:
screencasting is selected when the set of source display frames includes only encoded media;
GPU processing is selected when the set of source display frames includes only programmatically generated graphics; and
GPU processing with media streaming is selected when the set of source display frames includes both programmatically generated graphics and encoded media.

8. The method of claim 1, wherein the encoded media comprises images, video, or a combination of images and video.

9. The method of claim 1, wherein the GPU processing complies with OpenGL or DirectX.

10. The method of claim 1, wherein the screencasting complies with Miracast.

11. The method of claim 1, wherein the media streaming complies with DLNA media streaming.

12. The method of claim 1, further comprising:
when the selected transmission format is screencasting, the preparing comprises encoding the first set of display frames in a screencast encoding format.

13. The method of claim 1, wherein, when the selected transmission format is GPU processing, programmatically generated graphics are sent as a set of one or more GPU display commands which reference one or more graphics resources.

14. The method of claim 13, further comprising:
sending the one or more graphics resources referenced by the GPU display commands.

15. The method of claim 14, wherein the one or more graphics resources are sent before sending any GPU display commands.

16. The method of claim 1, wherein, when the selected transmission format is GPU processing with media streaming, portions of the set of source display frames comprising programmatically generated graphics are provided in the first set of display frames as a set of one or more GPU display commands which reference one or more graphics resources and portions of the first set of display frames which comprise encoded media are provided in the first set of display frames as encoded media objects.

17. The method of claim 1, wherein the selected transmission format is based on power consumption rating so that a lower power consumption rating is selected.

18. The method of claim 1, wherein the selected transmission format is based on one or more data types in the set of source display frames.

19. The method of claim 1, further comprising:
when one or more display frames in the set of source display frames is associated with multiple data types, the selected transmission format varies for portions of the one or more display frames in the different data type, wherein the selected transmission format of each portion of the one or more display frames is based on the data type associated with the respective portion,
when each frame in the set of source display frames is associated with one data type, the selected transmission format is based on the data type associated with the set of source display frames.

20. A wireless communication device, comprising:
a processor;
a graphics processing unit (GPU) coupled to the processor;
a wireless communication subsystem coupled to the processor;
a memory coupled to the processor and the GPU and storing instructions which configure the wireless communication device for:
prepare, by the processor and/or GPU of the source device, a first set of display frames for the sink device from a set of source display frames in accordance with a selected transmission format, wherein the selected transmission format is one of screencasting, graphics processing unit (GPU) processing or GPU processing with media streaming;
wirelessly transmit, by the wireless communication subsystem of the source device, the first set of display frames to the sink device;
determine, by the processor of the source device, whether predetermined performance criteria have been met; and
when the predetermined performance criteria have not been met and the selected transmission format is GPU processing or GPU processing with media streaming, change the selected transmission format from GPU processing or GPU processing with media streaming to screencasting.

21. A non-transitory machine readable medium having tangibly stored thereon executable instructions for execution by a wireless communication device, the wireless communication device comprising a processor, a graphics processing unit (GPU) coupled to the processor, and a wireless communication system coupled to the processor, wherein the executable instructions, when executed by the processor and/or GPU, cause the wireless communication device to:

prepare, by the processor and/or GPU of the source device, a first set of display frames for the sink device from a set of source display frames in accordance with a selected transmission format, wherein the selected transmission format is one of screencasting, graphics processing unit (GPU) processing or GPU processing with media streaming;

wirelessly transmit, by the wireless communication subsystem of the source device, the first set of display frames to the sink device;

determine, by the processor of the source device, whether predetermined performance criteria have been met; and when the predetermined performance criteria have not been met and the selected transmission format is GPU processing or GPU processing with media streaming, change the selected transmission format from GPU processing or GPU processing with media streaming to screencasting.

* * * * *